US006790491B2

(12) United States Patent
Sebastian et al.

(10) Patent No.: US 6,790,491 B2
(45) Date of Patent: Sep. 14, 2004

(54) BIAXIALLY-ORIENTED INK RECEPTIVE MEDIUM

(75) Inventors: John M. Sebastian, Maplewood, MN (US); Robert D. Taylor, Stacy, MN (US); Mary R. Boone, West Saint Paul, MN (US); Robert S. Kody, Minneapolis, MN (US); Stephen P. Polski, Ham Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 20 days.

(21) Appl. No.: 10/176,556

(22) Filed: Jun. 21, 2002

(65) Prior Publication Data

US 2003/0235681 A1 Dec. 25, 2003

(51) Int. Cl.[7] ................................................ B41M 5/40
(52) U.S. Cl. ............................... 428/32.23; 428/32.32; 428/32.34; 428/32.38
(58) Field of Search .......................... 428/32.23, 32.32, 428/32.34, 32.38

(56) References Cited

U.S. PATENT DOCUMENTS

| | | |
|---|---|---|
| 2,736,721 A | 2/1956 | Dexter |
| RE24,906 E | 12/1960 | Ulrich |
| 3,154,461 A | 10/1964 | Johnson |
| 3,265,769 A | 8/1966 | Schaffhausen |
| 3,407,253 A | 10/1968 | Yoshimura et al. |
| 3,738,904 A | 6/1973 | Ikeda et al. |
| 3,758,661 A | 9/1973 | Yamamoto et al. |
| 3,765,999 A | 10/1973 | Toyoda |
| 3,773,608 A | 11/1973 | Yoshimura et al. |
| 3,775,521 A | 11/1973 | Yamamoto et al. |
| 3,783,088 A | 1/1974 | Yoshiyasu et al. |
| 3,790,435 A | 2/1974 | Tanba et al. |
| RE28,606 E | 11/1975 | Ikeda et al. |
| 3,969,562 A | 7/1976 | Suzuki |
| 4,151,159 A | 4/1979 | Geall et al. |
| 4,318,950 A | 3/1982 | Takashi et al. |
| 4,330,590 A | 5/1982 | Vesley |
| 4,359,497 A | 11/1982 | Magder et al. |
| 4,391,687 A | 7/1983 | Vesley |
| 4,698,372 A | 10/1987 | Moss |
| 4,705,813 A | 11/1987 | Ito et al. |
| 4,833,172 A | 5/1989 | Schwarz et al. |
| 4,833,179 A | 5/1989 | Young et al. |
| 4,861,644 A | 8/1989 | Young et al. |
| 4,960,637 A | 10/1990 | Biczenczuk |
| 5,112,882 A | 5/1992 | Babu et al. |
| 5,120,594 A | 6/1992 | Mrozinski |
| 5,209,971 A | 5/1993 | Babu et al. |
| 5,461,134 A | 10/1995 | Leir et al. |
| 5,721,086 A | 2/1998 | Emslander et al. |
| 5,858,516 A | 1/1999 | Ou-Yang |
| 6,015,603 A | 1/2000 | Ou-Yang |
| 6,025,058 A | 2/2000 | Shepherd |
| 6,113,679 A | 9/2000 | Adkins et al. |
| 6,194,506 B1 | 2/2001 | Ochiai et al. |
| 6,316,120 B1 | 11/2001 | Emslander |
| 6,589,636 B2 * | 7/2003 | Emslander et al. .......... 428/195 |
| 2003/0049415 A1 * | 3/2003 | Pedginski et al. .......... 428/195 |

FOREIGN PATENT DOCUMENTS

| | | |
|---|---|---|
| EP | 0 810 077 A2 | 12/1997 |
| EP | 0 908 322 A1 | 4/1999 |
| GB | 2 210 375 A | 6/1989 |
| JP | 55-23734 | 6/1980 |
| JP | 2516639 | 7/1996 |
| WO | WO 01/96112 A1 | 12/2001 |

OTHER PUBLICATIONS

Allan F. M. Barton, CRC Handbook of Polymer–Liquid Interaction Parameters and Solubility Parameters, (1990), CRC Press, Inc., Boca Raton, FL.
Allan F. M. Barton, CRC Handbook of Solubility Parameters and Other Cohesion Parameters, 2$^{nd}$ Edition, (1991), CRC Press, Inc., Boca Raton, FL.
ASTM Designation: D 6488 "Standard Terminology Relating to Print Problems" (1999).
ASTM Designation: F 1857 "Standard Terminology Relating to Ink Jet Printers and Images Made Therefrom", (2001).
ASTM Designation: F 1944 "Standard Practice for Determining the Quality of the Text, Line– and Solid–Fill Ouptput Produced by Ink Jet Printers" (1998).
D. Satas, Handbook of Pressure Sensitive Adhesive Technology, 2$^{nd}$ Edition, (1989), Van Nostrand Reinhold, New York.
E. A. Grulke, "Solubility Parameter Values", Polymer Handbook, 3$^{rd}$ Edition, (1989), pp. 519–557, J. Brandrup & E. H. Immergut, Eds. John Wiley, New York.
Encyclopedia of Polymer Science and Engineering, (1988), vol. 13, A Wiley–Interscience Publication, John Wiley & Sons, New York.
Encyclopedia of Polymer Science and Technology, (1964), vol. 1, John Wiley & Sons, Inc., New York.
U.S. patent application Ser. No. 09/896,497, filed Jun. 29, 2001, Solvent Inkjet Ink Receptive Films.
U.S. patent application Ser. No. 10/059,591, filed Jan. 29, 2002, Receptor Medium Having A Microfibrillated Surface.

* cited by examiner

Primary Examiner—B. Shewareged
(74) Attorney, Agent, or Firm—Kent S. Kokko

(57) ABSTRACT

The invention provides an image receptor medium which comprises a biaxially oriented, melt-processed image receptive film comprising a) an immiscible blend of at least one semicrystalline polymer component and at least one ink absorptive polymer component and b) at least one inorganic filler. The image receptor medium may further comprise one or more additional layers such as support or adhesive layers.

22 Claims, 2 Drawing Sheets

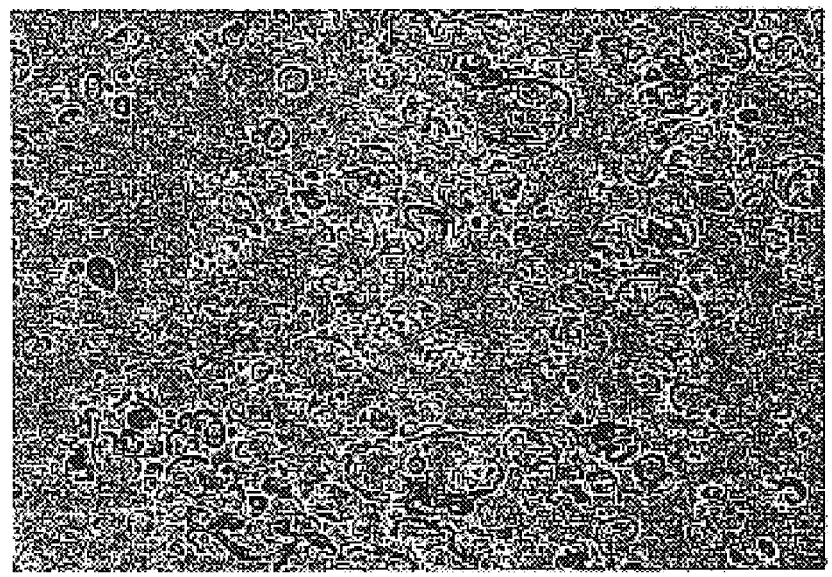
FIG. 1  300 μm
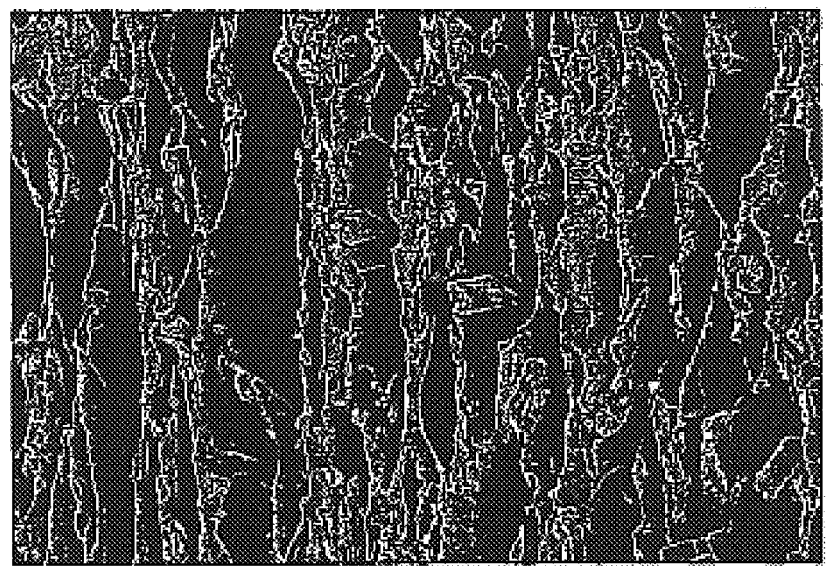
FIG. 2  30.0 μm

150 µm

300 µm

BIAXIALLY-ORIENTED INK RECEPTIVE MEDIUM

FIELD OF THE INVENTION

The present invention relates to films that are receptive to solvent-based inkjet inks and methods of printing onto such films. More specifically, the present invention relates to melt-processed films that are receptive to solvent-based inkjet inks and methods of printing onto such films. A variety of polymeric sheets may be prepared including various sheeting for signage and graphic films for advertising and promotional displays.

BACKGROUND OF INVENTION

A variety of print methods have been employed for imaging various sheet materials. Commonly employed print methods include gravure, off-set, flexographic, lithographic, electrographic, electrophotographic (including laser printing and xerography), ion deposition (also referred to as electron beam imaging (EBI)), magnetographics, inkjet printing, screen printing, and thermal mass transfer. More detailed information concerning such methods is available in standard printing textbooks.

One of ordinary skill in the art appreciates the differences in these various print methods and recognizes that a combination of ink and receiving substrate that results in high image quality in one printing method often exhibits an entirely different image quality with another print method. For example, in contact printing methods such as screen-printing, a blade forces the ink to advance and wet the receiving substrate. Image defects are typically due to a subsequent recession of the ink contact angle with the substrate. In the case of non-contact printing methods, such as inkjet printing, the individual ink drops are merely deposited on the surface. In order to achieve good image quality, the ink drops need to spread, join together, and form a substantially uniform, leveled film. This process requires a low advancing contact angle between the ink and the substrate. For any given ink/substrate combination, the advancing contact angle is typically significantly greater than the receding contact angle. Accordingly, ink/substrate combinations that result in good image quality when printed with contact methods such as screen printing, often exhibit insufficient wetting when imaged with non-contact printing methods such as inkjet printing. Insufficient wetting results in low radial diffusion of the individual ink drops on the surface of the substrate (also referred to as "dot gain"), low color density, and banding effects (e.g., gaps between rows of drops).

Another important difference between screen-printing and inkjet printing is the physical properties of the ink. Screen printing ink compositions typically contain over 40% solids and have a viscosity of at least two orders of magnitude greater than the viscosity of inkjet printing inks. It is not generally feasible to dilute a screen printing ink to make it suitable for inkjet printing. The addition of large amounts of low viscosity diluents drastically deteriorates the ink performance and properties, particularly the durability. Further, the polymers employed in screen printing inks are typically high in molecular weight and exhibit significant elasticity. In contrast, inkjet ink compositions are typically Newtonian.

Inkjet printing is emerging as the digital printing method of choice due to its good resolution, flexibility, high speed, and affordability. Inkjet printers operate by ejecting, onto a receiving substrate, controlled patterns of closely spaced ink droplets. By selectively regulating the pattern of ink droplets, inkjet printers can produce a wide variety of printed features, including text, graphics, holograms, and the like. The inks most commonly used in inkjet printers are water-based or solvent-based. Water-based inks require porous substrates or substrates with special coatings that absorb water.

SUMMARY OF THE INVENTION

In one aspect, the invention provides an image receptor medium comprising a porous, voided, melt-processed image receptive film layer comprising a) an immiscible blend of a semicrystalline polymer component and at least one ink absorptive polymer component and b) at least one inorganic filler. The image receptor medium may further comprise one or more additional layers such support or adhesive layers. The image receptor medium is a suitable substrate for non-contact ink-jet printing methods, and is also useful for contact printing methods. The present invention provides an image receptor medium having good color density, as measured by densitometry, and good resolution, particularly two color resolution, as measured by printing rows of parallel lines of alternating colors, the lines of the first color printed at 400% ink lay down (i.e. four passes by an ink-jet printer) and the lines of the second color being printed at 200% ink lay down, each line being printed at one-fiftieth of an inch thickness, and the lines are readily resolved by eye and do not bleed together. As used herein "ink lay down" means the amount of ink delivered to the surface of a substrate per unit of line length.

The ink absorptive polymer component may be selected using an Inclined Ink Trail test. Briefly, the test value is the ratio of the distance traveled by an ink droplet on an inclined test substrate to that of a poly(vinyl chloride) substrate. In this test, a film of a candidate ink absorptive polymer is mounted on an inclined substrate, an ink droplet, typically 10 microliters, is applied to it and the distance the droplet runs down the inclined surface is measured. This measured distance is then compared to the distance measured on a control poly(vinyl chloride) substrate. Useful ink absorptive polymer components are defined by the equation:

$$IT\#=Y/X=0.75 \text{ to } 2.0,$$

Where "IT#" is the inclined ink test value, X is the distance traveled by a droplet on an inclined poly(vinyl chloride) substrate and Y is the distance traveled on the candidate ink absorptive polymer component substrate.

It has been found if the inclined ink test value is less than 0.75, then the color density of the ultimate image receptive medium is poor, as a result of the solvent of the ink being absorbed too quickly. Conversely, if the inclined ink test value is greater than 2.0, the resolution of the ultimate image receptive medium is poor, as result of the ink absorptive polymer having no affinity for the solvent of the ink. Preferably, the inclined ink test value will be 0.9 to 1.25.

It will be understood with respect to the above description that candidate ink absorptive polymer components are tested using the inks specified for a particular printing process, and that depending on the inks employed, different ink absorptive polymer components may be selected. For example, in an ink jet printing process, ink jet printing inks would be used in evaluating candidate ink absorptive polymer components. Further, ink absorptive polymer components comprising blends of polymers may also be tested using the Inclined Ink Trail Test.

Although many poly(vinyl chloride) films may be used as a control in evaluating candidate ink absorptive polymer components, it has been found that the differences in the test results, i.e the X value, are generally minor, varying less than 10% between different commercially available films. One useful control film is 3M 180-10 Commercial Graphic vinyl film, available from the 3M Company. Another useful control film is MPI 1005 vinyl film, available from Avery-Dennison Graphics Div., Additional details on the Inclined Ink Trail Test are provided in the experimental section.

Many useful ink absorptive polymer components have a Hildebrand Solubility Parameter of said absorptive additive within about 3.1 $(MPa)^{1/2}$ of the solvent of the ink, wherein the image receptive layer has an ink solvent absorption of at least 50% greater than a film of semicrystalline polymer component alone.

In another aspect, the invention further comprises an image receptor medium comprising biaxially oriented, melt-processed image receptive film comprising a) at least one immiscible blend of a semicrystalline polymer component, an ink absorptive polymer component and b) at least one inorganic filler. The ink absorptive polymer component is, for example, an ethylene vinyl acetate carbon monoxide terpolymer. The image receptor medium of such a construction may further comprise one or more additional layers such as support or adhesive layers.

In another aspect, the invention provides a method of printing with an inkjet printer comprising the step of jetting a solvent-based inkjet ink onto an image receptor medium comprising a biaxially oriented, melt-processed image receptive layer comprising a) an immiscible blend of a semicrystalline polymer component and an ink absorptive polymer component and b) an inorganic filler.

In yet another aspect, the invention provides an imaged ink receptor media comprising an image receptive layer of the invention having an image printed thereon. The articles of the invention are useful as an intermediate or as a finished product for signage and graphic films.

BRIEF DESCRIPTION OF THE FIGURES

FIG. 1 is a digital image of a scanning electron micrograph (SEM) of the surface of the ink-receptive article of Example 1.

FIG. 2 is a digital image of a cross section of the image receptor medium of Example 1.

DETAILED DESCRIPTION OF THE INVENTION

Figure 3:
FIG. 3 is a digital image of a scanning electron micrograph (SEM) of the surface of the ink-receptive article of Example 10.

In one embodiment, the invention provides an image receptor medium comprising a single extrudable image receptive film layer. The image receptive layer is a layer that is receptive to solvent-based inkjet ink. "Solvent-based" means non-aqueous. The image receptive medium comprises a) an immiscible blend of a semicrystalline polymer component, an ink absorptive polymer component and b) an inorganic filler. In one embodiment, the image receptor medium comprises an optional support layer having two major surfaces and an image receptive layer bonded, adhered or otherwise affixed to the support layer. Optionally, the medium may further comprise an adhesive layer for affixing the medium to another substrate.

Semicrystalline polymers useful as the first polymer component in the immiscible mixture include any melt-processible crystalline, semicrystalline or crystallizable polymers or copolymers, including block, graft and random copolymers. Semicrystalline polymers consist of a mixture of amorphous regions and crystalline regions. The crystalline regions are more ordered and segments of the chains pack in crystalline lattices. If crystalline regions are heated above the melting temperature of the polymer, the molecules become less ordered or more random. If cooled rapidly, this less ordered feature is "frozen" in place and the resulting polymer is said to be amorphous. If cooled slowly, these molecules can repack to form crystalline regions and the polymer is said to be semicrystalline. Some polymers remain amorphous and show no tendency to crystallize. Some polymers can be made semicrystalline by heat treatments, stretching or orienting and by solvent inducement, and these processes can control the degree of crystallinity.

Semicrystalline polymers useful in the present invention include, but are not limited to, high and low density polyethylene, linear low density polyethylene, polypropylene, polyoxymethylene, poly(methyl pentene), poly(ethylene terephthalate), poly(butylene terephthalate), polybutene, and syndiotactic polystyrene.

The semicrystalline polymer component may further comprise small amounts of a compatible second polymer to impart desired properties to the receptive medium of the invention. The second polymer of such blends may be semicrystalline or amorphous and are used in amounts so that the mixture remains immiscible with the solvent absorptive polymer. The second polymer is generally less than 30 weight percent, based on the weight of the semicrystalline polymer component. For example, small amounts of linear low-density polyethylene may be added to polypropylene, when used as the semicrystalline polymer component, to improve the softness and drapability of the receptive articles. Small amounts of other polymers may be added, for example, to enhance stiffness, crack resistance, Elmendorff tear strength, elongation, tensile strength and impact strength, as is known in the art. The selection and amounts of any such other polymers to the semicrystalline polymer component should not deleteriously affect the immiscibility of the semicrystalline polymer component and the ink absorptive polymer component.

Typically the semicrystalline polymer component is present in the image receptive medium at a level of from about 60 to about 98 weight percent, preferably 80 to about 92 weight percent, relative to the weight of the immiscible polymer blend. The molecular weight of the semicrystalline polymer component should be chosen so that the polymer is melt processable under the processing conditions. For polypropylene and polyethylene, for example, the molecular weight may be from about 5000 to 500,000 and is preferably from about 100,000 to 300,000.

The ink absorptive polymer provides increased solvent absorbency to the image receptive layer such that ink bleeding and running is eliminated during printing. By "ink absorptive" it is meant that the polymer swells and absorbs the solvent component of the ink. Useful ink absorptive polymers are immiscible with the semicrystalline polymer component and have an Inclined Ink Trail Test value (IT#) of from 0.75 to 2.0. The ink absorptive polymer component may further have a Hildebrand solubility parameter within about 1.5 $(cal/cm^3)^{1/2}$ to $(3.1(MPa)^{1/2})$ of the solvent(s) of the ink. "Hildebrand solubility parameter" refers to a solubility parameter represented by the square root of the cohesive energy density of a material, having units of $(pressure)^{1/2}$, and being equal to $(\Delta H-RT)^{1/2}/V^{1/2}$ where $\Delta H$ is the molar vaporization enthalpy of the material, R is the universal gas constant, T is the absolute temperature, and V is the molar volume of the solvent. Hildebrand solubility parameters are tabulated for solvents in: Barton, A. F. M., *Handbook of Solubility and Other Cohesion Parameters*, $2^{nd}$ Ed., CRC Press, Boca Raton, Fla. (1991), for monomers and representative polymers in *Polymer Handbook*, $3^{rd}$ Ed., J. Brandrup & E. H. Immergut, Eds. John Wiley, NY, pp 519–557 (1989), and for many commercially available polymers in Barton, A. F. M., *Handbook of Polymer-Liquid Interaction Parameters and Solubility Parameters*, CRC Press, Boca Raton, Fla. (1990).

Useful ink absorptive additive polymer components include poly(meth)acrylic polymers such as PARALOID and ACRYLOID polymers from Rohm and Haas, Philadelphia, Pa., and ELVACITE polymers from Ineos Acrylics, Cordova, Tenn.; vinyl polymers such as UCAR polymers from Union Carbide, Danbury, Conn., a subsidiary of The Dow Chemical Company; and polystyrene polymers such as STYRON polymers available from The Dow Chemical Company, Midland, Mich. or styrene/acrylonitrile copolymers such as LURAN available form BASF, Mount Olive, N.J. Other vinyl/poly(vinyl chloride) polymers are available from BF Goodrich Performance Materials, Cleveland, Ohio, and BASF, Mount Olive. N.J. Useful (meth) acrylic polymers have a Tg of 90° C. or less.

Specific examples of useful (meth)acrylic polymers include copolymers of methyl methacrylate with butyl acrylate, butyl methacrylate, isobutyl methacrylate, or isobornyl methacrylate (e.g., PARALOID DM-55, PARALOID B48N, PARALOID B66, ELVACITE 2550), copolymers of isobutylmethacrylate and butyl methacrylate (e.g., ELVACITE 2046), and isobutyl methacrylate polymers (e.g., PARALOID B67). Specific examples of useful vinyl and polystyrene polymers include UCAR VYHH, VMCC, and VAGH vinyl polymers available from Union Carbide; STYRON 478, 663, 678C, and 693 polystyrene polymers from The Dow Chemical Company; and 145D and 148G polystyrene polymers from BASF, Mount Olive, N.J.

The incorporation of butyl acrylate, butyl methacrylate, isobutyl methacrylate, or isobornyl methacrylate co-monomer into methyl methacrylate polymers reduces the solubility parameter of the resulting (meth)acrylic polymer such that the solubility parameter of the polymer more closely matches that of the solvent system in the inks, thereby providing faster solvent absorption for the print receptive blend. The incorporation of these co-monomers into (meth)acrylic polymer also typically reduces the glass transition temperature of the (meth)acrylic polymer which may also facilitate solvent uptake by the image receptive layer. Combinations of such polymers may also be used as the ink absorptive polymer.

Generally, copolymers comprising the reaction product of olefin monomers and a sufficient amount of at least one polar monomer (modified olefin resins) provide the desired ink receptivity. Specific examples of useful copolymers include copolymers of ethylene and vinyl acetate, carbon monoxide, and methyl acrylate; copolymers of acid and/or acrylate modified ethylene and vinyl acetate; and terpolymers of ethylene and any two polar monomers, for example, vinyl acetate and carbon monoxide.

Other useful ink receptive polymers include urethanes and polyesters such as thermoplastic polyurethanes and polyether-ester elastomers. Useful thermoplastic urethane resins include MORTHANE PN343-200, MORTHANE PN 3429-218, MORTHANE PN 03-214, AND MORTHANE L 425 181 from Rohm and Haas, Philadelphia, Pa.; ESTANE 58315 AND ESTANE 58271 and those sold under the trade designation ELASTOLLAN from BF Goodrich, Cleveland, Ohio; TEXIN DP7-3006 AND TEXIN DP7-3007 from Bayer Corporation, Pittsburgh, Pa.; PELLETHANE 2354 AND PELLETHANE 2355 from The Dow Chemical Company, Midland Mich.

Useful polyether-ester resins include HYTREL G3548L; HYTREL G4078W; and HYTREL G4778 from E. I. duPont De Nemours, Wilmington, Del. Other useful copolyester resins include those available from Eastman Chemical, Kingsport, Tenn. under the trade designation EASTAR.

Commercially available modified olefin resins include: BYNEL 3101, an acid-acrylate modified ethylene vinyl acetate copolymer; ELVALOY 741, a terpolymer of ethylene/vinyl acetate/carbon monoxide; ELVALOY 4924, a terpolymer of ethylene/vinyl acetate/carbon monoxide; ELVALOY 1218AC, a copolymer of ethylene and methyl acrylate; and FUSABOND MG-423D, a modified ethylene/acrylate/carbon monoxide terpolymer (EVACO). All are available from E. I. duPont De Nemours, Wilmington Del.

The amount of the three monomers in the terpolymer can range from about 50% to about 80% and preferably from about 65% to about 75% weight percent of ethylene monomer; from about 10% to about 30% and preferably from about 20% to about 24% weight percent of vinyl acetate monomer; and from about 4% to about 15% and preferably from about 8% to about 10% carbon monoxide monomer.

The other polymer that can be blended with EVACO polymer typified by ELVALOY resin can be any polymer that is effective in use with the EVACO including without limitation, ethylene vinyl acetate resins, ethylene (meth) acrylic acid copolymer resins, polyethylene resins, polypropylene resins, ionomers, ethylene methyl acrylate resins or acid-modified or acid/acrylate modified ethylene vinyl acetate resins. The acrylate resins are more broadly disclosed as having at least two monoethylenically unsaturated monomeric units, wherein one monomeric unit comprises a substituted alkene where each branch comprises from 0 to about 8 carbon atoms and wherein one other monomeric unit comprises a (meth)acrylic acid ester of a nontertiary alkyl alcohol in which the alkyl group contains from 1 to about 12 carbon atoms and can include heteroatoms in the alkyl chain and in which the alcohol can be linear, branched, or cyclic in nature.

Nonlimiting examples of the first monomeric units include ethylene, propylene, butene, isobutylene, hexene, octene, and the like. Nonlimiting examples of the second monomeric units include methyl(meth)acrylate, ethyl(meth) acrylate, butyl(meth)acrylate, 2-ethylhexyl acrylate, ethoxyethyl acrylate, hexyl acrylate, and the like. Of these polymers, ethylene methyl acrylates (EMAc) and ethylene ethyl acrylates (EEAc) are preferred because of their commercial availability. The polymer can be a random or block copolymer Preferably, the number of carbon atoms ranges from 2 to about 4 for the first monomeric unit and from 4 to about 8 for the second monomeric unit although the number of carbon atoms can be the same or different, and a mixture of different carbon length monomers can be used.

The quantity of polymers of the present invention in the image receptive layer is preferably maximized within the limits of performance requirements of the image receptor medium. Routine efforts could be needed to optimize this quantity. The optimum quantity will depend upon the desired application and the targeted cost for the image receptor medium.

Where the ink-receptive polymer component comprises a blend of two or more ink receptive polymers (such as a blend of a (meth)acrylate copolymer and an ethylene/vinyl acetate/carbon monoxide terpolymer), the blend weight ratio of can be from 100:0 to about 5:95 and preferably from about 85:15 to about 15:85 and most preferably about 80:20 to 20:80, the desired ratio depending significantly on the chemical properties of the other resin blended with the ethylene/vinyl acetate/carbon monoxide terpolymer and can be determined without undue experimentation by one skilled in the art.

The ink absorptive polymer component is generally present in the image receptive layer in amounts of from about 2 to 40 weight percent, preferably 8 to 20 weight percent, relative to the weight of the immiscible polymer blend. Further, the ink absorptive polymer is present in amounts such that the absorptive polymer forms a discreet, discontinuous phase in a continuous matrix, and on the surface, of the semicrystalline polymer.

In a preferred embodiment, the ink absorptive polymer component may comprise a miscible or immiscible mixture of two or more ink absorptive polymers, each of which may be chosen to be immiscible with the semicrystalline polymer component. In a particularly preferred embodiment such a mixture comprises a (meth)acylate copolymer and an ethylene/vinyl acetate/carbon monoxide terpolymer, as previously described.

The semicrystalline polymer component and the ink absorptive polymer component are chosen so as to form an immiscible mixture. As used herein, "immiscibility" refers to polymer blends with limited solubility and non-zero interfacial tension, i.e. a blend whose free energy of mixing is greater than zero:

$$\Delta G_m \cong \Delta H_m > 0$$

Miscibility of polymers is determined by both thermodynamic and kinetic considerations. Common miscibility predictors for non-polar polymers are differences in solubility parameters or Flory-Huggins interaction parameters. For polymers with non-specific interactions, such as polyolefins, the Flory-Huggins interaction parameter can be calculated by multiplying the square of the solubility parameter difference with the factor (V/RT), where V is the molar volume of the amorphous phase of the repeated unit, R is the gas constant, and T is the absolute temperature. As a result, Flory-Huggins interaction parameter between two non-polar polymers is always a positive number.

With the immiscible polymer blend used in the invention, the relative amounts of the semicrystalline polymer component and ink absorptive polymer component may be chosen so the first semicrystalline polymer component forms a continuous phase and the second absorptive polymer component forms a discontinuous phase. The relative amounts of each polymer can vary widely, but generally the amount of the ink absorptive component in the composition is from 2% by weight to 40% by weight, more preferably from 8% by weight to 20% by weight with respect to the immiscible polymer blend.

In such constructions, the amount of ink absorptive component will affect final film properties. In general, as the amount of the ink absorptive component increases, the amount of voiding in the final biaxially oriented film also increases. As a result, properties that are affected by the amount of voiding in the film, such as mechanical properties, density, light transmission, etc., will depend upon the amount of added ink absorptive component. When the amount of ink absorptive polymer in the blend is increased, a composition range will be reached at which the ink absorptive polymer can no longer be easily identified as the dispersed or discrete phase. Further increase in the amount of ink absorptive polymer in the blend will result in a phase inversion wherein the ink absorptive polymer becomes the continuous phase.

Additionally, the selected ink absorptive component must be immiscible with the semicrystalline polymer component selected. In this context, immiscibility means that the discrete phase does not dissolve into the continuous semicrystalline polymer phase in a substantial fashion, i.e., the discrete phase must form separate, identifiable domains within the matrix provided by the continuous phase. It has been found that in the absence of ink receptive polymer component the resulting image receptor medium lacks sufficient porosity at the surface with the result that the ink tends to run too much and resolution is impaired. The surface porosity allows the applied ink to contact the ink-receptive polymer component and absorb the ink solvent.

The inorganic filler may be chosen to have an average particle size of from about 0.1 to 25 microns and may be any shape including amorphous shapes, spindles, plates, diamonds, cubes, needles, fibers and spheres. Useful inorganic solids useful as inorganic filler components include solid or hollow glass, ceramic or metal particles, microspheres or beads; zeolite particles; inorganic compounds including, but not limited to metal oxides such as titanium dioxide, alumina and silicon dioxide; metal, alkali- or alkaline earth carbonates, silicates, metasilicates or sulfates; kaolin, talc, clays, carbon black and the like. Inorganic filler components are chosen so as to have little surface interaction, due to either chemical nature or physical shapes, when dispersed in the semicrystalline polymer component. In general the inorganic filler components should not be chemically reactive with the semicrystalline polymer component, including Lewis acid/base interactions, and have minimal van der Waals interactions. The role of the filler is to further induce void formation upon stretching by debonding from the polymer matrix.

The inorganic fillers such as crystalline and amorphous silica, clay particles, aluminum silicate, titanium dioxide and calcium carbonate, and the like impart one or more of desirable properties such as improved solvent absorption, improved dot gain and color density, opacity and improved abrasion resistance. Preferably such fillers are coated to reduce agglomeration and improve dispersability. The amount of such fillers in the image receptive layers of the invention typically range from about 20% to about 50% by weight, relative to the total weight of image receptive layer (i.e. semicrystalline polymer component, ink absorptive polymer component and filler). Preferably, the amount of fillers is at least about 30%, most preferably 40% by weight.

To enhance durability of the image receptive layer, especially in outdoor environments exposed to sunlight, a variety of commercially available stabilizing chemicals can be added optionally to the primer compositions. These stabilizers can be grouped into the following categories: heat stabilizers, UV light stabilizers, and free-radical scavengers.

Heat stabilizers are commonly used to protect the resulting image graphic against the effects of heat and are commercially available from Witco Corp., Greenwich, Conn. under the trade designation Mark V 1923 and Ferro Corp., Polymer Additives Div., Walton Hills, Ohio under the trade designations Synpron 1163, Ferro 1237 and Ferro 1720. Such heat stabilizers can be present in amounts ranging from about 0.02 to about 0.15 weight percent.

Ultraviolet light stabilizers can be present in amounts ranging from about 0.1 to about 5 weight percent of the total primer or ink. Benzophenone type UV-absorbers are commercially available from BASF Corp., Parsippany, N.J. under the trade designation Uvinol 400; Cytec Industries, West Patterson, N.J. under the trade designation CYASORB UV1164 and Ciba Specialty Chemicals, Tarrytown, N.Y., under the trade designations TINUVIN 900, TINUVIN 123 and TINUVIN 1130.

Free-radical scavengers can be present in an amount from about 0.05 to about 0.25 weight percent of the total primer composition. Nonlimiting examples of free-radical scavengers include hindered amine light stabilizer (HALS) compounds, hydroxylamines, sterically hindered phenols, and the like.

HALS compounds are commercially available from Ciba Specialty Chemicals under the trade designation TINUVIN 292 and Cytec Industries under the trade designation CYASORB UV3581.

In general, the image receptive layer is typically substantially free of colorant. However, it may also contain colorants to provide a uniform background colored film.

In another embodiment of the invention the image receptor medium may further comprise a support layer to reduce the cost and/or enhance the physical properties of the medium. The support layer is most commonly white and opaque for graphic display applications, but could also be transparent, translucent, or colored. Support layer can comprise any polymer having desirable physical properties for the intended application. Properties of flexibility or stiffness, durability, tear resistance, conformability to non-uniform surfaces, die cuttability, weatherability, solvent resistance (from solvents in inks) heat resistance and elasticity are examples. For example, a graphic marking film used in short term outdoor promotional displays typically can withstand outdoor conditions for a period in the range from about 3 months to about one year or more and exhibits tear resistance and durability for easy application and removal.

The material for the support layer may be a melt-processible polymer which may be extruded or coextruded into a substantially two-dimensional film, or may be melt coated, bonded or otherwise affixed to the biaxially oriented medium. The support layer is preferably resistant to solvents used in inks. "Resistant to solvents in inks" means that the support layer does not absorb significant amounts of the solvents in the ink, and does not allow migration of significant amounts of solvent through the film, if used in combination with an adhesive on the opposite side of the receptor layer. "Significant" means the film does not allow enough solvent to pass through the film to negatively impact the adhesion performance of the underlying adhesive layer. For example, the barrier layer would prevent solvents from plasticizing the adhesive layer. Typical solvents used in inkjet inks include 2-butoxyethyl acetate available from the 3M Company, Saint Paul, Minn. under the trade designation 3M SCOTCHCAL™ Thinner CGS-50, 1-methoxy-2-acetoxy-propane available from under the trade designation 3M SCOTCHCAL™ Thinner CGS-10, cyclohexanone, dipropylene glycol methylether acetate, and other acetates such as those sold under the trade designation EXXATE™ available from Exxon Chemical, Houston, Tex. Examples of suitable materials support layer include polyester, polyolefin, polyamide, polycarbonate, polyurethane, polystyrene, acrylic, or combinations thereof. Examples of such materials include paper, polypropylene, polyethylene terephthalate, polyethylene coated papers, fabrics, non-woven materials, scrims, and the like.

The support layer may also contain other components such as pigments, fillers, ultraviolet stabilizing agents, slip agents, antiblock agents, antistatic agents, and processing aids familiar to those skilled in the art. The support layer is commonly white opaque, but may also be transparent, colored opaque, or translucent.

A typical thickness of the support layer is in the range from 0.5 mil (12.7 micrometers) to 12 mils (305 micrometers). However, the thickness may be outside this range providing the resulting image receptor medium is not too thick to feed into the printer or image transfer device of choice. A useful thickness is generally determined based on the requirements of the desired application.

If desired, an adhesive layer may be applied to a major surface of the image receptor medium of the invention. Typically, the adhesive layer would be applied to a major surface of the support layer of a multilayer article comprising the image receptive layer and the support layer. The adhesive may be applied to the receptor medium by any means known in the art including melt-coating, transfer coating, solvent coating, lamination and extrusion or coextrusion. The adhesive layer may be activated by pressure, heat, solvent or any combination thereof and may be of any type based on a poly($\alpha$-olefin), a block copolymer, an acrylate, a rubber/resin, or a silicone. The adhesive may be applied at conventional coating weights (e.g., 0.0001 to 0.02 g/cm$^2$) using any conventional coating means such a slot die or a gravure roll. The support layer may also be treated with a conventional primer coating, and/or activated by flame or corona discharge, and/or by another surface treatment to enhance adhesion of the adhesive layer thereto.

Although it is preferable to use a pressure sensitive adhesive, any adhesive that is particularly suited to the substrate layer and to the selected application can be used. Such adhesives are those known in the art and may include aggressively tacky adhesives, pressure sensitive adhesives, repositionable or positionable adhesives, hot melt adhesives, and the like.

When a pressure sensitive adhesive (psa) layer is used, pressure sensitive adhesives useful in the present invention can be self-tacky or require the addition of a tackifier. Such materials include, but are not limited to, tackified natural rubbers, tackified synthetic rubbers, tackified styrene block copolymers, self-tacky or tackified acrylate or methacrylate copolymers, self-tacky or tackified poly-$\alpha$-olefins, and tackified silicones. Examples of suitable pressure sensitive adhesives are described in U.S. Pat. No. Re 24,906 (Ulrich), U.S. Pat. No. 4,833,179 (Young et al.), U.S. Pat. No. 5,209,971 (Babu et al.), U.S. Pat. No. 2,736,721 (Dexter), U.S. Pat. No. 5,461,134 (Leir et al.), U.S. Pat. No. 4,391,687 (Vesley), U.S. Pat. No. 4,330,590 (Vesley) and U.S. Pat. No. 5,112,882 (Babu), the entire disclosure of which is incorporated herein by reference. Others are described in the *Encyclopedia of Polymer Science and Engineering*, vol. 13, Wiley-Interscience Publishers, New York, 1988, the *Encyclopedia of Polymer Science and Technology*, vol. 1, Interscience Publishers, New York, 1964 and *Handbook of Pressure-Sensitive Adhesives*, D. Satas, Editor, 2$^{nd}$ Edition, Von Nostrand Reinhold, New York, 1989.

A prime layer may be used to increase the bond strength between the support layer and an adhesive layer if the bond strength is not sufficiently high without the prime layer. The presence of an adhesive layer makes the image receptor medium useful as an adhesive backed graphic marking film.

The image receptor media of the invention may also have an optional tie layer (not shown) between image receptive layer and the support layer. A tie layer is used to improve adhesion between the image receptive layer and the support layer. Useful tie layers include extrudable polymers such as ethylene vinyl acetate polymers, and modified ethylene vinyl acetate polymers (modified with acid, acrylate, maleic anhydride, individually or in combinations). The tie layer may consist of these materials by themselves or as blends of these polymers with the semicrystalline polymer component. Use of tie layer polymers is well known in the art and varies depending on the composition of the two layers to be bonded. Tie layers for extrusion coating could include the same types of materials listed above and other materials such as polyethyleneimine that are commonly used to enhance the adhesion of extrusion coated layers. Tie layers can be applied to the support layer or ink absorptive layer by coextrusion, extrusion coating, laminating, or solvent coating processes.

The inks particularly useful in combination with the coextruded construction of the invention include the SCOTCHCAL™ 3700 series and SCOTCHCAL™ 4000 series solvent-based piezo inkjet inks, available from the 3MCompany, St. Paul, Minn., the ULTRAVU™ series solvent-based piezo inkjet inks, available from VUTEK, Meredith, N.H., and the ARIZONA™ 1100-3 solvent-based inks, available from RasterGraphics of the Gretag Imaging Group, San Jose, Calif. Such inks typically consist of a colorant, dye, or pigment, a dispersant if pigment is used, a binder, and a blend of solvents. Additional optional components include stabilizers, flow agents, viscosity modifiers, and others. A detailed description of a typical solvent-based inkjet ink formulation can be found in U.S. Pat. No. 6,113,679.

Generally, the image receptor layer is prepared from a melt-blend obtained by feeding a mixture of the semicrystalline polymer, the ink-absorptive polymer and the inorganic filler into a hopper of an extruder. This mixture is conveyed through the extruder that is heated, preferably with individually controlled temperature zones heated at increasing temperatures toward the extruder exit to a slot die that has a slit gap of 25 to 1,000 micrometers. Preferably, the semicrystalline polymer is fed into a hopper of the extruder and the additional components are fed by a suitable device into the extruder via a port in the extruder wall intermediate to the hopper and the extruder exit. It is also preferable to utilize a suitable mixing device such as a static mixer between the extruder exit and the slot die. In passing through the extruder, and, where used, the static mixer, the mixture of polymer and additional components are heated to a temperature at or above the glass transition temperature of the semicrystalline polymer (but below the thermal degradation temperature of the polymer) and mixed to form a melt-blend solution that is extruded through a slot die as a film layer into a liquid quench bath maintained at a suitable temperature below the glass transition temperature of the semicrystalline polymer using a suitable coolant, e.g., water. The cooled film may then be fed from the quench bath to a machine-direction orienting device, a transverse direction-orienting device (or a simultaneous orienting device) and then to a take-up roller.

Generally, the film is cast onto a temporary carrier web, but the image receptive layer may also be coextruded with, or melt-cast onto, a support layer. Typically, the image receptive layer is at least 0.5 mils (12.7 micrometers) thick, and preferably between 0.7 mils (17.8 micrometers) and 4 mils (102 micrometers).

The image receptive layer is then oriented to impart voids to the receptor. Generally, it is preferred to orient a film consisting of only a single layer of the image receptive layer, although multilayer articles such an image receptive layer and a support layer may be oriented. Upon orientation, voids are imparted to the image receptive layer, which assumes a porous, three-dimensional cellular structure having a network of interconnected adjacent cells to allow passage of fluid from one major surface, through the thickness of the image receptor layer to the opposite major surface. As the image receptive layer is stretched, the components (the semicrystalline polymer component, the ink absorptive polymer component and the inorganic filler) separate due to the immiscibility of the components and poor adhesion between the phases. As the image receptive layer comprises a continuous phase and a discontinuous phase, the discontinuous phase(s) serves to initiate voids that remain as substantially discrete, discontinuous irregularly shaped phases in the cellular matrix of the continuous phase. The porous, voided structure of the ink-receptive layer allows the ink to contact the ink-receptive polymer so that the solvent may be absorbed. The lack of a porous, voided structure will result in poor image resolution as the ink bleeds on the surface of the layer, rather than drying by absorption of the ink solvent by the ink absorptive polymer component. It will be understood that a support layer affixed to the image receptive layer may block the porosity of one major surface, but not the porous matrix of the image receptor layer or other major surface thereof.

The conditions for orientation are chosen such that the integrity of the image receptive layer is maintained. Thus when stretching in the machine and/or transverse directions, the temperature is chosen such that substantial tearing or fragmentation of the continuous phase is avoided and image receptive layer integrity is maintained. The image receptive layer is particularly vulnerable to tearing or even catastrophic failure if the temperature is too low, or the orientation ratio(s) is/are excessively high. Preferably, the orientation temperature is above the glass transition temperature, but below the melt temperature, of the continuous phase. Such temperature conditions permit maximum orientation in the machine (X) and transverse (Y) directions without loss of film integrity, maximize voiding imparted to the image receptive layer.

Voids arise due to both the poor stress transfer between the polymeric phases of the immiscible blend and debonding from the inorganic particulates. It is believed that low molecular attractive forces between the blend components are responsible for immiscible phase behavior; low interfacial tension results in void formation when the image receptive layers are stressed by orientation or stretching. Typical voids have major dimensions X and Y, proportional to the degree of orientation in the machine and transverse direction respectively. A minor dimension Z, normal to the plane of the image receptive layer, may remain substantially the same as the cross-sectional dimension of the discrete phase (ink absorptive polymer) prior to orientation if oriented at a temperature below the $T_g$ of the ink absorptive polymer, or may be substantially reduced if oriented at a temperature above the $T_g$ of the ink absorptive polymer.

It is preferred that the biaxial orientation is such that the resulting voids at the surface have an average diameter (in the X and Y directions) less than or equal to the average size of the inkjet droplets applied thereto. The inkjet droplets have an average size of about 70 micrometers for currently available inkjet printers. Thus the voids may have an average major diameter of less than or equal to 70 micrometers and it is preferred that the voids have an average major diameter of about 10 to 70 micrometers.

Voids of the open cellular structure are relatively oblate ellipsoidal in shape, irregular in size, and have semi-continuous boundaries as result of adjacent voids having apertures therebetween to impart a porous morphology to the ink receptive layer. Voids are generally coplanar with the film, with major axes in the machine (X) and transverse (Y) directions (directions of orientation). The size of the voids is variable and proportional to the size of the discrete phase and degree of orientation. Image receptive layers having relatively large domains of discrete phase and/or relatively high degrees of orientation will produce relatively large voids. Image receptive layers having a high proportion of discrete phases will generally produce image receptive layers having a relatively high void content on orientation. Void size, distribution and amount in the image receptive layer matrix may be determined by techniques such as small angle x-ray scattering (SAXS), confocal microscopy, scanning electron microscopy (SEM) or density measurement.

Generally, greater void content enhances the quality of the print or image imparted to the image receptor medium. It is believed that the open cellular structure provides a large surface area to enhance the ink flow on the surface and the absorption of the ink solvent by the ink absorptive polymer component, which is advantageously exposed to the ink by the voiding and open cellular structure. Preferably, the image receptive layer should have a void content in excess of 30%, preferably in excess of 50%, more preferably in excess of 60% as measured by density; i.e., the ratio of the density of the voided image receptive layer with that of the starting image receptive layer.

In the orienting step, the image receptive layer is stretched in the machine direction (X axis) and simultaneously or sequentially stretched in the transverse direction to impart a biaxial orientation to the image receptive layer. The stretching conditions are chosen to impart voids (in excess of 30% as measured by the change in density) and the requisite open porous structure to the film. The occurrence of a significant amount of voids will impart a translucent, opalescent or silvery appearance to the surface of the image receptive layer due to light scattering from the defects. The presence of voids may be verified by small-angle x-ray or density measurement, or by microscopy.

Stretching in mutually perpendicular directions at a temperature above the glass transition temperature of the semicrystalline polymer continuous phase may biaxially orient the image receptive layer. Generally, the film is stretched in one direction first and then in a second direction perpendicular to the first. However, stretching may be effected in both directions simultaneously if desired. In a typical process, the film is stretched first in the direction of extrusion over a set of rotating rollers or between two pairs of nip rollers and is then stretched in the direction transverse thereto by means of a tenter apparatus. Films may be stretched in each direction up to 2 to 10 times their original dimension in the direction of stretching. The image receptive layer may be biaxially stretched 5× to 100× total draw ratio, which is defined herein as the ratio of the final area to the initial area of the image receptor medium.

When sequentially oriented, the temperature of the first orientation (or stretching) affects image receptive layer. Generally, the first orientation step is in the machine direction. Orientation temperature control may be achieved by controlling the temperature of heated rolls or by controlling the addition of radiant energy, e.g., by infrared lamps, as is known in the art. A combination of temperature control methods may be utilized.

Too low an orientation temperature may result in a film with an uneven appearance. Increasing the first orientation temperature may reduce the uneven stretching, giving the stretched film a more uniform appearance. The first orientation temperature also affects the amount of voiding that occurs during orientation. In the temperature range in which voiding occurs, the lower the orientation temperature, generally the greater the amount of voiding that occurs during orientation. As the first orientation temperature is raised, the degree of voiding decreases to the point of elimination. Electron micrographs of samples show that at temperatures at which no voiding occurs, the discrete phases domains often deform during stretching. If sequential, the temperature of such second orientation is generally similar to or higher than the temperature of the first orientation.

Using polypropylene, for example, as the semicrystalline polymer component, the first orientation, in the machine direction, may be conducted at temperature from about 60–160° C., and then in the transverse direction at temperature from about 130–160° C. If oriented simultaneously in the machine and transverse direction, temperatures from about 130–160° C. are found to be useful.

After the film has been stretched it may be further processed. For example, the film may be annealed or heat-set by subjecting the film to a temperature sufficient to further crystallize the semicrystalline polymer component while restraining the film against retraction in both directions of stretching. Further, the image receptive layer may be laminated, bonded or otherwise affixed to a support layer. If a two-layer article comprising the image receptive layer and a support layer is provided, (by coextrusion or prior lamination for example) the support layer should be chosen so that it may be oriented as well. In embodiments where the image receptive layer is coextruded with a support layer, it is preferable to orient the composite article as it exits the die. Thus a composite article comprising an image receptive layer, a support layer, and optionally a tie layer, may be fed from the extruder to the orienting apparatus.

The image receptive layer, alone or with a support layer, may also be provided with an adhesive layer after orientation as well.

The final thickness of the image receptive layer will be determined in part by the casting thickness, the degree of orientation, and any additional processing such as calendering. For most uses, the final thickness of the image receptive layer will be 1 to 20 mils (0.025 to 0.5 mm), preferably 3 to 10 mils (0.075 to 0.25 mm). The article of the invention will generally exhibit a color density measurement of at least about 1.1, preferably at least about 1.2 and most preferably at least about 1.3 as measured by densitometry. Additionally the articles may exhibit a two-color resolution of at least 0.5 mm as measured by the "two-color line width resolution test" described herein. The color density is generally a function of the ink-absorptive polymer, as selected by the Inclined Ink Trail Test for a particular ink (and corresponding ink solvent) and printing technique used. The resolution is generally a function of the average surface pore size, which should be equal to or less than the average ink droplet applied thereto. Further, the average surface pore size is a function of the degree of orientation, amount of inorganic filler, and the amount of ink-receptive polymer used. An iterative process to optimize the resolution for a given ink and printing technique may adjust each of these.

The biaxially oriented articles may be a finished product (with printing) or an intermediate and are useful for a variety of articles including signage and graphics films. Signage includes various retroreflective sheeting products for traffic control as well as non-retroreflective signage such as backlit signs.

The article is suitable for use as roll-up signs, flags, banners and other articles including other traffic warning items such as roll-up sheeting, cone wrap sheeting, post wrap sheeting, barrel wrap sheeting, license plate sheeting, barricade sheeting and sign sheeting; vehicle markings and segmented vehicle markings; pavement marking tapes and sheeting; as well as graphics films. Graphic films include a variety of advertising, promotional, and corporate identity imaged films. The films typically comprise a pressure sensitive adhesive on the non-viewing surface in order that the films can be adhered to a target surface such as an automobile, truck, airplane, billboard, building, awning, window, floor, etc.

Objects and advantages of the invention are further illustrated by the following examples, but the particular materials and amounts thereof recited in the examples, as well as other conditions and details, should not be construed to unduly limit the invention. All parts, percentages and ratios herein are by weight unless otherwise specified.

EXAMPLES

Printing Method

Unless specified otherwise, a Xaar Jet XJ128-100 piezo-electric inkjet printhead (available from Xaar Ltd., Cambridge, England) on an x-y translational stage at 317 by 295 dots per inch resolution was employed to print test patterns. The test patterns consisted of filled squares and lines printed at 100%–400% ink lay down. These patterns were used to evaluate image quality. The inks that were used were SCOTCHCAL 3700 series inks (available from 3M, St. Paul, Minn.), specifically 3791 magenta, 3792 yellow, 3795 black and 3796 cyan.

Test Methods

Test Method 1: Draw Ratio Measurements

The machine direction (MD) and transverse direction (TD) draw ratios of biaxially oriented films were determined by inscribing equally spaced lines perpendicular to both of the stretching directions prior to stretching and by calculating the corresponding ratio of the final line spacing (after stretching) to the initial spacing.

Test Method 2: Density Measurement and Void Content Determination

Densities of cast sheets and oriented films were measured at 21° C. in deionized water according to the method of ASTM D792-00. Each film sample was weighed on a Mettler AG285 high precision balance (manufactured by Mettler-Toledo, Inc., Columbus, Ohio) and then placed underwater. The buoyant force of the water on the sample was measured using the density determination apparatus (Kit#238490, manufactured by Mettler-Toledo, Inc., Columbus, Ohio). The volume of water displaced by the sample was thereby determined and, in combination with the sample weight, used to calculate the sample density. The void content was then calculated as follows:

Calculated % Void Content={1-(final density/initial density)}×100 where the initial density is the density of the cast film before orientation, and the final density is the density of the oriented film.

Test Method 3: Image Quality Evaluation

Image quality was evaluated using the printing test patterns described above by observing characteristics such as inter-color bleed, color uniformity, edge sharpness, and overall appearance of the test pattern. To quantitatively compare the ability of a film to control inter-color bleed and maintain high resolution, arrays of alternating parallel lines of two different colors (red and black) were printed immediately adjacent to one and other. The red lines were printed at 200% ink coverage, and the black lines were printed at 400% ink coverage, but both red and black lines were printed at the same width. A number of these arrays of alternating black and red lines were printed on a substrate with each array having a different characteristic line width ranging from 0.085 mm to 0.68 mm. The smallest line width that was still easily resolved on a given substrate as its "two-color line width resolution" (TLWR). Thus, a substrate having a smaller TLWR will have superior resolution and less inter-color bleed than a substrate having a larger TLWR.

Solid block color density (CD) was measured using a Gretag SPM-55 densitometer, available from Gretag-MacBeth A G, Regensdorf, Switzerland. Specifically, CD of a solid black square printed at 100% ink lay-down was measured at a wavelength of 410 nm and an observer angle of 2°. No background subtraction was used, and the reported values were the average of three measurements. An increase in CD correlated to an increase or improvement in solid ink fill.

The dryness of ink immediately after printing was noted by lightly touching a piece of paper to the test pattern and observing if any ink transferred from the substrate to the paper.

Test Method 4: Inclined Ink Trail Test

The Inclined Ink Trail Test was designed to screen potential ink-receptive polymer components that are useful for blending with polypropylene in order to make ink receptive films. Vinyl films were used as a standard since they are known to provide high image quality when printed with the testing ink. Three vinyl films were used as standards: CONTROLTAC PLUS Vinyl Film 180-10, SCOTCHCAL 3555 Vinyl Film (both available from 3M, St. Paul, Minn.), and MPI 1005 cast vinyl film (available from Avery Dennison Graphics Division, Hazerswoude, The Netherlands). The standard films were wiped with isopropanol prior to testing. Potential ink-receptive polymer components were cast as flat sheets either by solvent-casting or extrusion. These flat sheet films were adhered to a 45-degree inclined plane and were conditioned at room temperature (21° C.) prior to testing. The inclined plane was 40 cm in length. The ink receptivity of the films was evaluated by depositing a 10 $\mu$l droplet of inkjet ink (black, SCOTCHCAL 3795, 3M) using a 25 $\mu$l syringe at the top of the incline. The ink was allowed to run down the incline until it stopped due to evaporation or absorption into the film. The distance that the ink traveled (three trials each) was recorded and compared to ink traveling on standard materials. In addition an Ink Trail Number (IT#) was recorded as the ratio of the distance the ink traveled compared to CONTOLTAC PLUS Vinyl film 180-10. Additives which produced films with an IT# closest to one (closest in behavior in the Inclined Ink Trail Test to vinyl film) were used to make further blends and are described in the examples. The potential polymer additives that were screened are shown in Table 1.

TABLE 1

Polymers Evaluated in Inclined Ink Trail Test

| Material | Composition | Vendor |
| --- | --- | --- |
| FINA 3376 | Polypropylene | Atofina, Inc., Houston, TX |
| CP-80 Clear | Poly(methyl methacrylate) | Ineos Acrylics, Cordova TN |
| ELVALOY 741 | Ethylene/vinylacetate/ carbon monoxide | Dupont, Wilmington, DE |
| ELVAX 240 | Ethylene/vinyl acetate | Dupont, Wilmington DE |
| ENGAGE 8200 | Ethylene/1-octene | Dow Dupont, Wilmington, DE |

TABLE 1-continued

Polymers Evaluated in Inclined Ink Trail Test

| Material | Composition | Vendor |
| --- | --- | --- |
| KRATON D-1107 | Stryene/isoprene block copolymer | Kraton Polymers, Houston TX |
| LURAN 358N | Styrene/acrylonitrile | BASF, Mount Olive, NJ |
| PARALOID B-67 | Poly(isobutyl methacrylate) | Rohm & Haas, Philadelphia, PA |

All of the polymer additives except the PARALOID B-67 were prepared as films for Inclined Ink Trail testing by extrusion using the following process: The resins were extruded using a PLASTI-CORDER Laboratory batch mixer (type DR-2051, manufactured by C. W. Brabender Instruments, Inc., South Hackensack, N.J.) equipped with a ¾" (19 mm) single screw extruder and a 6" (15.2 cm) wide ribbon die (manufactured by Extrusion Dies, Inc., Chippewa Falls, Wis.) having a gap of 0.30 mm operating at 200° C. and 80 rpm. The molten polymer films were cast onto a 0.05 mm polyester carrier film (SCOTCHPAK 970197, available from 3M, St. Paul, Minn.) and then passed through a 3 roll chilled stack and wound up. The films were 0.10–0.13 mm in thickness. The PARALOID B-67 was cast from solvent. 40% by weight of resin was dissolved in 2-butoxyethyl acetate (SCOTCHCAL Thinner CCS-50 available from 3M, St. Paul, Minn.). This solution was coated using a notched bar coater set with a 0.025 mm gap onto the same polyester carrier film. The film was dried at 65° C. for 1 hour to drive off the solvent.

In Table 2 the results of the Inclined Ink Trail test are shown for films of the potential polymer additives in Table 1 as well as the three standard vinyl films described above. The results in Table 2 indicate that there is only a minor difference between the ink trail length obtained on the three different vinyl films, although these films have different thicknesses and are from different manufacturers. In all three cases, the average ink trail length was measured to be approximately 8.5 cm±0.4 cm. This observation suggests that this test is a good measure of the net interaction of an ink with a given type of resin. For polypropylene, the ink trail was longer than the length of the inclined plane, demonstrating the very low affinity of the ink for polypropylene. For the potential print additives, the trail lengths ranged from 6.25 to 17 cm, indicating that there is a wide variation in the affinity of the ink for the various resins.

TABLE 2

Results for inclined ink running test

| Material | Ink Trail Length (cm) | IT# |
| --- | --- | --- |
| 3M Controltac Plus Vinyl Film 180-10 | 8.8 | 1.00 |
| 3M Scotchcal 3555 Vinyl Film | 8.9 | 1.01 |
| Avery MPI ™ 1005 cast Vinyl Film | 8.2 | 0.93 |
| FINA3376 | >40 | large |
| CP-80 Clear | 16.6 | 1.89 |
| Elvaloy 741 | 7.6 | 0.86 |
| Elvax 240 | 9.8 | 1.11 |
| Engage 8200 | 17 | 1.93 |
| Kraton D-1107 | 6.3 | 0.72 |
| Luran 358N | 7.5 | 0.85 |
| Paraloid B-67 | 8.6 | 0.98 |

Comparative Example C1

This comparative example is a demonstration of solvent-based piezoelectric inkjet printing on a commercially available vinyl graphics film (CONTROLTAC PLUS Graphic Film 180-10, available from 3M Company, St. Paul, Minn.). The vinyl film was cleaned with isopropyl alcohol to remove any contaminants and then printed upon using the Xaar piezoelectric inkjet printer as described above.

Image Quality: The ink coverage on the film surface was uniform with no significant mottling. Evaluation of the test pattern indicated that the TLWR was 0.50 mm. The CD was 1.92. Thus, the image quality of this substrate was regarded as being very good. Its primary deficiency is that the ink was still very wet immediately after printing.

Comparative Example C2

This comparative example is a demonstration of solvent-based piezoelectric inkjet printing on a microporous film.

Sample Preparation: A microporous film was prepared via the method of thermally induced phase separation as described in U.S. Pat. No. 5,120,594. The film was 5.5 mils thick and had 40% voids and pore sizes in the range of 0.5–0.8 um as indicated by the scanning electron microscopy (SEM) image.

Image Quality: The microporous film sample was printed upon using the Xaar piezoelectric inkjet printer as described above. The ink coverage on the film surface was uniform with no significant mottling. Evaluation of the test pattern indicated that the TLWR was 0.42 mm. The CD was 0.95. Although this substrate yields superior resolution than C1, its CD is extremely low. Both of these results are due to the high degree of capillarity associated with the microporous structure. The micropores prevent inter-color bleeding and provide high resolution, but they also draw the ink away from the surface and cause the image color density to fade. It was also observed that the ink was completely dry immediately after printing, a result that is also due to the micropores drawing the ink rapidly away from the surface.

Comparative Example C3

This comparative example is a demonstration of solvent-based piezoelectric inkjet printing on a multi-layer biaxially oriented film comprised of a voided core layer containing polypropylene and an inorganic filler, and thin non-void surface layers.

Sample Preparation: A multi-layer sheet was prepared consisting of a core layer containing 60 weight % polypropylene homopolymer (FINA 3376 available from Atofina, Inc., Houston, Tex.) and 40 weight % calcium metasilicate (wollastonite Micronite 800H available from Fibertec Inc., Bridgewater, Mass.) with thin surface layers of polypropylene homopolymer. The core layer was compounded in a 60 mm twin screw extruder (available from Berstorff GmbH, Hannover, Germany) and the surface layers were supplied via a 38 mm single screw extruder (available from Davis-Standard, Pawcatuck, Conn.). The two extruders fed the materials into a feedblock and die (supplied by Cloeren Inc., Orange, Tex.), and the sheet was cast onto a chrome wheel half-submersed in a water bath. The extruders and feedblock/die were both operated at 250° C., and the cast roll and water bath were operated at 20° C. The cast sheet produced was 1.5 mm thick, with each surface layer approximately 0.03 mm thick. The cast sheet had a density of 1.22 g/cm$^3$.

From the cast sheet, 85 mm×85 mm square specimens were cut out and biaxially oriented in a Karo IV Laboratory Stretcher (manufactured by Brückner Maschinenbau GmbH, Siegsdorf, Germany) at 160° C. A simultaneous balanced stretch at 4.2 m/min in both the MD and the TD was employed, resulting in a final biaxial draw ratio of 3.5×3.5 (MD×TD) as determined by Test Method 1. The resulting oriented film had a thickness of approximately 0.1 mm and a density of 0.82 g/cm$^3$, indicating a void content of 33% as per Test Method 2.

Image Quality: The voided film sample was printed upon using the Xaar piezoelectric inkjet printer as described above. The ink coverage on the film surface was very non-uniform with significant mottling and coalescing of the ink. Because of the high degree of inter-color bleeding, the test pattern was not resolvable, and it was not possible to measure a TLWR. Although the ink coverage was non-uniform, it was possible to measure a solid block CD in certain regions of 1.7. It was also observed that the ink was very wet immediately after printing. Thus, although this substrate is highly voided internally, it is not porous enough to physically draw the ink away from the surface, as is the case for example C2. Because polypropylene has a very low affinity for the ink (cf. Table 2) ink does not dissolve into the substrate. Thus, the ink remains on the surface, and at high ink coverage, it tends to bleed because there is no interaction with the surface to keep it from flowing. The final result is a very poor image quality.

Comparative Example C4

This comparative example is a demonstration of solvent-based piezoelectric inkjet printing on a biaxially oriented voided film comprised of polypropylene and an inorganic filler.

Sample Preparation: A 75 g batch of 64 weight % polypropylene homopolymer (FINA 3374 available from Atofina Inc., Houston, Tex.) with 36 weight % calcium metasilicate (wollastonite Micronite grade 800H available from Fibertec Inc., Bridgewater, Mass.) was compounded at 200° C. in a Plasti-Corder Laboratory batch mixer (type DR-2051, manufactured by C. W. Brabender Instruments, Inc., South Hackensack, N.J.) until melted (roughly three to five minutes at 50 to 100 RPM). The resulting mixture was then pressed into a sheet between metal platens, using a 0.09 cm spacer shim, in a hot press (model G-30H-1S-LP manufactured by Wabash MPI, Wabash, Ind.) at 200° C. under a load of 454 kg for 3 min, followed by pressing under a load of 18,160 kg for an additional 30 seconds, and finally quenched between cold clamps cooled with running tap water for 3 minutes. The density of the resulting pressed sheet was 1.18 g/cm$^3$ and the thickness was approximately 1 mm.

From the pressed sheet, 85 mm×85 mm square specimens were cut out and biaxially oriented in a Karo IV Laboratory Stretcher (manufactured by Brückner Maschinenbau GmbH, Siegsdorf, Germany) at 150° C. A simultaneous balanced stretch at 4.2 m/min in both the MD and the TD was employed, resulting in a final biaxial draw ratio of 6×6 (MD×TD) as determined by Test Method 1. The resulting oriented film had a thickness of approximately 0.05 mm and a density of 0.50 g/cm$^3$, indicating a void content of 58% as per Test Method 2. SEM images of the surface and cross-section of the voided film indicate that although the film is indeed highly voided, the surface is substantially non-porous.

Image Quality: The voided film sample was printed upon using the Xaar piezoelectric inkjet printer as described above. As with example C3, the ink coverage on the film surface was very non-uniform with significant mottling and coalescing of the ink. Indeed the test pattern was not resolvable, making it impossible to measure a TLWR. It was possible to measure a solid block CD in certain regions of 1.57. It was also observed that the ink was very wet immediately after printing. As with example C3, this poor image quality is a result of the low porosity and low affinity of the ink for the polypropylene surface. SEM reveals the surface has only a meager number of pores even though it has been stretched significantly and is over 50% voids. Thus, it is not enough to simply orient a particulate filled-polypropylene film to generate a porous substrate suitable for inkjet printing.

Example 1

This example is a demonstration of solvent-based piezoelectric inkjet printing on a biaxially oriented film comprised of a blend of polypropylene with inorganic filler, and a terpolymer of ethylene/vinyl acetate/carbon monoxide.

Sample Preparation: A 75 g batch of 64 weight % polypropylene homopolymer (FINA 3374 available from Atofina Inc., Houston, Tex.) with 40 weight % calcium metasilicate (wollastonite Micronite grade 800H available from Fibertec Inc., Bridgewater, Mass.) and 5 weight % of a terpolymer of ethylene/vinyl acetate/carbon monoxide (ELVALOY 741 available from DuPont Packaging and Industrial Polymers, Wilmington, Del.) was compounded in the same manner as described in example C4. The density of the resulting pressed sheet was 1.27 g/cm$^3$ and the thickness was approximately 1 mm.

From the pressed sheet, 85 mm×85 mm square specimens were cut out and biaxially oriented in a Karo IV Laboratory Stretcher at 150° C. as described in example C3, resulting in a final biaxial draw ratio of 3.5×3.5 (MD×TD) as determined by Test Method 1. The resulting oriented film had a thickness of approximately 0.2 mm and a density of 0.44 g/cm$^3$, indicating a void content of 65% as per Test Method 2. FIGS. 1 and 2 show SEM images of the surface and cross-section of the oriented film, indicating that the film is highly voided with a surface that is porous.

Image Quality: The porous film sample was printed upon using the Xaar piezoelectric inkjet printer as described above. In contrast to examples C3 and C4, the ink coverage on the film surface was very uniform with no significant mottling. Evaluation of the test pattern indicated that the TLWR was 0.42 mm, equivalent to that of the microporous film, example C2. The CD was 1.24, which is greater than example C2, but less than the CDs of C3 and C4, indicating that some of the ink was drawn into the pores away from the surface. This transfer of ink away from the surface decreased the CD but resulted in an increase in resolution and control of inter-color bleeding as indicated by the lower value of TLWR. It was also observed that the ink was only slightly wet immediately after printing. As shown in FIG. 1, the surface has a significant number of pores that are generally less than 100 $\mu$m in diameter. It appears that adding the second resin significantly improved the image quality over the other oriented polypropylene films (Examples C2, C3, and C4). This is because the presence of the second resin resulted in an increase in the number of surface pores, allowing the control of inter-color bleeding (in contrast to C3 and C4) and also because it's higher affinity for the ink (see Table 2) caused the CD to remain relatively high (in contrast to C2). Finally, the porosity of the film served to increase the rate of ink drying of the film over that of C1, C3, and C4.

Example 2

This example is a demonstration of solvent-based piezoelectric inkjet printing on a biaxially oriented film comprised of a blend of polypropylene with inorganic filler, and a terpolymer of ethylene/vinyl acetate/carbon monoxide.

Sample Preparation: A sample was compounded, pressed, and stretched in the same manner as Example 1 except that the final biaxial stretch was 5.5×5.5 (MD×TD) as determined by Test Method 1. The resulting oriented film had a thickness of approximately 0.065 mm and a density of 0.33 g/cm$^3$, indicating a void content of 74% as per Test Method 2. SEM images of the surface and cross-section of the oriented film indicate that the film is highly voided with a surface that is porous. In comparison to Example 1, the interior of the film is composed of thinner layers of polymer that are more widely spaced, resulting in the higher void content. These differences are due to the larger draw imposed on the film during orientation.

Image Quality: The porous film was printed upon using a Xaar piezoelectric inkjet printhead described above. Similar to Example 1, the ink coverage on the film surface was uniform with no significant mottling. Evaluation of the test pattern indicated that the TLWR was 0.59 mm. This value is greater than that of Example 1, indicating that there is a greater amount of inter-color bleed and lower resolution. The CD was 1.33, which is slightly greater than Example 1, but less than the CDs of C3 and C4, indicating that some the ink is being drawn into the pores away from the surface but slightly less than Example 1. Thus, the orientation imposed on this sample as compared to Example 1 generates a pore system that does not transfer the ink away from the surface quickly enough to maintain high resolution and low inter-color bleed. Indeed, immediately after printing, the surface of the film was significantly wetter than that of Example 1.

Example 3

This example is a demonstration of solvent-based piezoelectric inkjet printing on a biaxially oriented film comprised of a blend of polypropylene with inorganic filler, and a terpolymer of ethylene/vinyl acetate/carbon monoxide.

Preparation: A sample was compounded and pressed in a similar manner to Example 1 except that it contained 40 weight % polypropylene homopolymer (FINA 3374 available from Atofina Inc., Houston, Tex.) with 40 weight % calcium metasilicate (wollastonite Micronite grade 800H available from Fibertec Inc., Bridgewater, Mass.) and 20 weight % of a terpolymer of ethylene/vinyl acetate/carbon monoxide (ELVALOY 741 available from DuPont Packaging and Industrial Polymers, Wilmington, Del.). The density of the resulting pressed sheet was 1.26 g/cm$^3$, and the thickness was approximately 1 mm. The pressed sheet was stretched in the same manner as Example 1 with a final biaxial stretch of 3.5×3.5 (MD×TD) as determined by Test Method 1. The resulting oriented film had a thickness of approximately 0.23 mm and a density of 0.37 g/cm$^3$, indicating a void content of 71% as per Test Method 2. SEM image of the surface of the oriented film indicates that the surface is porous.

Image Quality: The porous film was printed upon using a Xaar piezoelectric inkjet printhead described above. The ink coverage on the film surface was somewhat non-uniform with some mottling evident. Evaluation of the test pattern indicated that the TLWR was 0.67 mm. This value is greater than that of Examples 1 and 2, indicating that there is a greater amount of inter-color bleeding and lower resolution. The CD was 1.19, which is less than Examples 1 and 2. This is likely due to the mottled ink coverage leading to small regions of entrapped white space. The poorer ink coverage and greater amount of bleeding may be attributed to the large size of the surface pores for this sample in comparison to Examples 1 and 2. SEM reveals that the surface pores are several times larger in diameter for this sample than the previous two. Thus, although this sample has been stretched in the same fashion as Example 1 and has the same print additive, the higher content of the ELVALOY 741 in the film resulted in a distinctly different pore structure and a distinctly poorer image quality. Thus, there is a complex interaction between the amount of print additive, the resulting pore structure and interaction with the ink that must be carefully optimized to generate the best inkjet printing quality.

Example 4

This example is a demonstration of solvent-based piezoelectric inkjet printing on a biaxially oriented film substrate comprised of a blend of polypropylene with an inorganic filler and an ethylene and vinyl acetate copolymer resin.

Sample Preparation: A sample was compounded and pressed in a similar manner to Example 1 except that it contained 40 weight % polypropylene homopolymer (FINA 3374 available from Atofina Inc., Houston, Tex.) with 40 weight % calcium metasilicate (wollastonite Micronite grade 800H available from Fibertec Inc., Bridgewater, Mass.) and 20 weight % of an ethylene and vinyl acetate copolymer resin (ELVAX 240 available from DuPont Packaging and Industrial Polymers, Wilmington, Del.). The density of the resulting pressed sheet was 1.25 g/cm$^3$ and the thickness was approximately 1 mm. The pressed sheet was stretched in the same manner as Example 1 with a final biaxial stretch of 3.5×3.5 (MD×TD) as determined by Test Method 1. The resulting oriented film had a thickness of approximately 0.13 mm and a density of 0.45 g/cm$^3$, indicating a void content of 65% as per Test Method 2. SEM images of the surface and cross-section of the oriented film indicate that the film is highly voided with a surface that is very porous. In comparison to Example 1, the interior of the film is composed of thicker layers of polymer that are more widely spaced apart, and the surface contains a distribution of pores that vary in size much more broadly than in Example 1. Indeed, some are greater than 200 $\mu$m in diameter.

Image Quality: The porous film was printed upon using a Xaar piezoelectric inkjet printhead described above. The ink coverage on the film surface was very non-uniform with a significant amount of mottling evident. Because of the high degree of inter-color bleeding, the test pattern was not resolvable, and it was not possible to measure a TLWR. Although the ink coverage was non-uniform, it was possible to measure a solid block CD in certain regions of 1.06. This low value is likely due to both the mottled ink coverage leading to small regions of entrapped white space and the large pores that allow the ink to penetrate quickly below the surface. Thus, although this sample has been stretched in the same fashion as Example 1 and has a print additive that has a good affinity for the ink (cf. Table 1), the pore structure was not optimal for inkjet printing, and the image quality was significantly lower. Most likely this is due to the presence of surface pores that are larger in size than the diameter of an ideal dot of ink (ca. 65 $\mu$m based on a 70 $\mu$L droplet) immediately after it has been jetted from the print head and landed on the surface. It was noted that the ink was dry immediately after printing.

Example 5

This example is a demonstration of solvent-based piezoelectric inkjet printing on a biaxially oriented film comprised of a blend of polypropylene with an inorganic filler and an ethylene and a styrenic thermoplastic elastomer.

Sample Preparation: A sample was compounded and pressed in a similar manner to Example 1 except that it contained 40 weight % polypropylene homopolymer (FINA 3374 available from Atofina Inc., Houston, Tex.) with 40 weight % calcium metasilicate (wollastonite Micronite grade 800H available from Fibertec Inc., Bridgewater, Mass.) and 20 weight % of a styrenic thermoplastic elastomer (KRATON D-1107 available from Kraton Polymers, Houston, Tex.). The density of the resulting pressed sheet was 1.25 g/cm$^3$, and the thickness was approximately 1 mm. The pressed sheet was stretched in the same manner as Example 1 with a final biaxial stretch of 3.5×3.5 (MD×TD) as determined by Test Method 1. The resulting oriented film had a thickness of approximately 0.15 mm and a density of 0.48 g/cm$^3$, indicating a void content of 62% as per Test Method 2. SEM images of the surface of the oriented film indicate that the film's surface is very porous. In comparison to Example 1, the surface contains significantly larger pores, some greater than 150 μm in diameter.

Image Quality: The porous film was printed upon using a Xaar piezoelectric inkjet printhead described above. The ink coverage on the film surface was very non-uniform with a significant amount of mottling evident. Because of the high degree of inter-color bleeding, the test pattern was not resolvable, and it was not possible to measure a TLWR. Although the ink coverage was non-uniform, it was possible to measure a solid block CD in certain regions of 0.60. This low value is likely due to a several of factors. As with Example 4, the mottled ink coverage and large pore size tend to decrease CD, but the very high affinity of the ink for the Kraton Resin (cf. Table 2) tended to make the CD drop even lower in this case. Thus, as with Example 4 the pore structure was not optimal for inkjet printing. However, the choice of print additive made the CD even lower. It was noted that the ink was dry immediately after printing.

In addition to inkjet printing, a portion of this sample was also printed upon via traditional screen-printing for comparison. The sample was printed using a screen printing station (CAMEO 2455, available from American Screen Printing Equipment Company, Chicago Ill.) with commercially available black ink (Scotchcal 9705, available from 3M Company, Saint Paul, Minn.) and a 380 mesh screen. After printing, the ink was cured in a UV curing station (Model CV-38-T3, available from American Ultraviolet Company, Murray Hill, N.J.) consisting of two banks of lamps with a net energy exposure of 180 mJ/cm$^2$. In contrast to inkjet printing, the image quality of the screen-printed sample was relatively high with no bleeding, high resolution and a color density of 1.33.

Example 6

This example is a demonstration of solvent-based piezoelectric inkjet printing on a biaxially oriented film comprised of a blend of polypropylene with an inorganic filler and poly(methyl methacrylate).

Sample Preparation: A sample was compounded and pressed in a similar manner to Example 1 except that it contained 50 weight % polypropylene homopolymer (FINA 3374 available from Atofina Inc., Houston, Tex.) with 40 weight % calcium metasilicate (wollastonite Micronite grade 800H available from Fibertec Inc., Bridgewater, Mass.) and 10 weight % of poly(methyl methacrylate) (CP-80 Clear, available from Ineos Acrylics Inc., Cordova, Tenn.). The density of the resulting pressed sheet was 1.27 g/cm$^3$, and the thickness was approximately 1 mm. The pressed sheet was stretched in the same manner as Example 1 with a final biaxial stretch of 3.5×3.5 (MD×TD) as determined by Test Method 1. The resulting oriented film had a thickness of approximately 0.25 mm and a density of 0.31 g/cm$^3$, indicating a void content of 76% as per Test Method 2.

Image Quality: The porous film was printed upon using a Xaar piezoelectric inkjet printhead described above. The ink coverage on the film surface was somewhat non-uniform with some mottling evident. Evaluation of the test pattern indicated that the TLWR was 0.67 mm. This value is greater than that of Example 1, indicating that there is a greater amount of inter-color bleeding and lower resolution. The CD was 1.23, helping the overall image quality to approach a satisfactory level. It was observed that the sample was slightly wet immediately after printing.

Example 7

This example is a demonstration of solvent-based piezoelectric inkjet printing on a biaxially oriented film comprised of a blend of polypropylene with an inorganic filler and poly(isobutyl methacrylate).

Sample Preparation: A sample was compounded and pressed in a similar manner to Example 1 except that it contained 50 weight % polypropylene homopolymer (FINA 3374 available from Atofina Inc., Houston, Tex.) with 40 weight % calcium metasilicate (wollastonite Micronite grade 800H available from Fibertec Inc., Bridgewater, Mass.) and 10 weight % of poly(isobutyl methacrylate) (PARALOID B-67 available from Rohm and Haas, Co., Philadelphia, Pa.). The density of the resulting pressed sheet was 1.26 g/cm$^3$, and the thickness was approximately 1 mm. The pressed sheet was stretched in the same manner as Example 1 with a final biaxial stretch of 3.5×3.5 (MD×TD) as determined by Test Method 1. The resulting oriented film had a thickness of approximately 0.25 mm and a density of 0.41 g/cm$^3$, indicating a void content of 67% as per Test Method 2.

Image Quality: The porous film was printed upon using a Xaar piezoelectric inkjet printhead described above. The ink coverage on the film surface was uniform with no significant mottling evident. Evaluation of the test pattern indicated that the TLWR was 0.67 mm. This value is greater than that of Example 1, indicating that there is a greater amount of inter-color bleeding and lower resolution. The CD was 1.15. With respect to Example 6, which contains the same weight % of a different methacrylate resin, it is noteworthy that the difference between their relative IT#s (Table 2) is reflected in the differences in the ink uniformity on their surfaces, i.e. Example 6 is more mottled. It was observed that the sample was slightly wet immediately after printing.

Example 8

This example is a demonstration of solvent-based piezoelectric inkjet printing on a biaxially oriented film comprised of a blend of polypropylene with an inorganic filler and styrene acrylonitrile copolymer.

Sample Preparation: A sample was compounded and pressed in a similar manner to Example 1 except that it contained 50 weight % polypropylene homopolymer (FINA 3374 available from Atofina Inc., Houston, Tex.) with 40 weight % calcium metasilicate (wollastonite Micronite grade 800H available from Fibertec Inc., Bridgewater, Mass.) and 10 weight % of styrene acrylonitrile copolymer (LURAN 358

N available from BASF Corporation, Mount Olive, N.J.). The density of the resulting pressed sheet was 1.26 g/cm³ and the thickness was approximately 1 mm. The pressed sheet was stretched in the same manner as Example 1 with a final biaxial stretch of 3.5×3.5 (MD×TD) as determined by Test Method 1. The resulting oriented film had a thickness of approximately 0.15 mm and a density of 0.34 g/cm³, indicating a void content of 73% as per Test Method 2. SEM images of the surface of the oriented film indicate that the film's surface is very porous. In comparison to Example 1, the surface contains significantly larger pores, some greater than 150 µm in diameter.

Image Quality: The porous film was printed upon using a Xaar piezoelectric inkjet printhead described above. The ink coverage on the film surface was somewhat non-uniform with a small amount of mottling evident. Because of the significant degree of inter-color bleeding, the test pattern was not resolvable, and it was not possible to measure a TLWR. Although the ink coverage was non-uniform, it was possible to measure a solid block CD in certain regions of 1.26. Thus, although the CD was relatively high, the large amount of inter-color bleeding and mottled ink coverage made the overall image quality low. These issues are most likely due to the large size of the surface pores.

Comparative Example C-5

This example is a demonstration of solvent-based piezoelectric inkjet printing on a biaxially oriented film comprised of a blend of polypropylene with an inorganic filler and an ethylene octene copolymer.

Sample Preparation: A sample was compounded and pressed in a similar manner to Example 1 except that it contained 50 weight % polypropylene homopolymer (FINA 3374 available from Atofina Inc., Houston, Tex.) with 40 weight % calcium metasilicate (wollastonite Micronite grade 800H available from Fibertec Inc., Bridgewater, Mass.) and 10 weight % of ethylene octene copolymer (ENGAGE 8200 available from Dow DuPont Elastomers L.L.C., Wilmington, Del.). The density of the resulting pressed sheet was 1.23 g/cm³, and the thickness was approximately 1 mm. The pressed sheet was stretched in the same manner as Example 1 with a final biaxial stretch of 3.5×3.5 (MD×TD) as determined by Test Method 1. The resulting oriented film had a thickness of approximately 0.13 mm and a density of 0.62 g/cm³, indicating a void content of 49% as per Test Method 2. SEM images of the surface of the oriented film indicate that the film's surface is not porous, similar to that of Example C4.

Image Quality: The voided film sample was printed upon using the Xaar piezoelectric inkjet printer as described above. As with example C4, the ink coverage on the film surface was very non-uniform with significant mottling and coalescing of the ink. Indeed the test pattern was not resolvable, making it impossible to measure a TLWR. It was, however, possible to measure a solid block CD in certain regions of 1.3, and it was also observed that the ink was very wet immediately after printing. As with example C4, the poor image quality and slow drying rate are both results of the low porosity and low affinity of the ink for the polypropylene surface. SEM reveals the surface has practically no pores even though it has been stretched significantly and is almost 50% voids. Apparently, addition of the ethylene/1-octene copolymer at this loading does not produce a porous structure, in contrast to the previous Examples that contain a second resin component. Possibly this is due to the fact that the ethylene/1-octene copolymer is more miscible with the polypropylene, making the interfaces between the polymer phases stronger such that they do not tear apart when the film stretched. It is this tearing apart of the immiscible phases that induces the pore structure to develop in these systems.

Example 9

This example is a demonstration of solvent-based piezoelectric inkjet printing on a biaxially oriented film comprised of a blend of polypropylene with an inorganic filler, a terpolymer of ethylene/vinyl acetate/carbon monoxide, and poly(isobutyl methacrylate).

Sample Preparation: A sample was compounded and pressed in a similar manner to Example 1 except that it contained 50 weight % polypropylene homopolymer (FINA 3374 available from Atofina Inc., Houston, Tex.) with 40 weight % calcium metasilicate (wollastonite Micronite grade 800H available from Fibertec Inc., Bridgewater, Mass.), 5 weight % of a terpolymer of ethylene/vinyl acetate/carbon monoxide (ELVALOY 741 available from DuPont Packaging and Industrial Polymers, Wilmington, Del.), and 5 weight % of poly(isobutyl methacrylate) (PARALOID B-67 available from Rohm and Haas, Co., Philadelphia, Pa.). The density of the resulting pressed sheet was 1.27 g/cm³ and the thickness was approximately 1 mm. The pressed sheet was stretched in the same manner as Example 1 with a final biaxial stretch of 3.5×3.5 (MD×TD) as determined by Test Method 1. The resulting oriented film had a thickness of approximately 0.23 mm and a density of 0.38 g/cm³, indicating a void content of 70% as per Test Method 2. SEM images of the surface of the oriented film indicates that the film is highly voided with a surface that is very porous.

Image Quality: The porous film was printed upon using a Xaar piezoelectric inkjet printhead described above. Similar to Example 1, the ink coverage on the film surface was uniform with no significant mottling. Evaluation of the test pattern indicated that the TLWR was 0.50 mm, and the CD was 1.24. These values are identical to Example 1, and indeed, the overall image qualities of the two samples were nearly equivalent. Comparison of the SEM micrographs indicates that the surface pore sizes of the two samples were very similar, both generally less than 100 µm in diameter. In addition, this sample was dry after immediately printing. Thus, by incorporating of a blend of different resin additives with IT#s indicative of favorable interactions with the ink (cf. Table 2), it is also possible to generate an inkjet printing substrate with a good image quality.

In addition to inkjet printing, this sample was also printed upon via traditional screen-printing for comparison, as described in Example 5. In contrast to inkjet printing, the image quality of the screen-printed sample was relatively high with no bleeding, high resolution and a color density of 1.73.

Example 10

This example is a demonstration of solvent-based piezoelectric inkjet printing on a biaxially oriented film comprised of a blend of polypropylene with an inorganic filler, a terpolymer of ethylene/vinyl acetate/carbon monoxide, and poly(isobutyl methacrylate).

Sample Preparation: A sample was compounded and pressed in a similar manner to Example 1 except that it contained 40 weight % polypropylene homopolymer (FINA 3374 available from Atofina Inc., Houston, Tex.) with 40 weight % calcium metasilicate (wollastonite Micronite grade 800H available from Fibertec Inc., Bridgewater, Mass.), 10 weight % of a terpolymer of ethylene/vinyl acetate/carbon monoxide (ELVALOY 741 available from DuPont Packaging and Industrial Polymers, Wilmington, Del.), and 10 weight % of poly(isobutyl methacrylate) (PARALOID B-67 available from Rohm and Haas, Co., Philadelphia, Pa.). The density of the resulting pressed sheet was 1.28 g/cm$^3$, and the thickness was approximately 1 mm. The pressed sheet was stretched in the same manner as described in Example 1 with a final biaxial stretch of 3.5×3.5 (MD×TD) as determined by Test Method 1. The resulting oriented film had a thickness of approximately 0.23 mm and a density of 0.43 g/cm$^3$, indicating a void content of 66% as per Test Method 2. SEM images of the surface of the oriented film indicates that the film is highly voided with a surface that is very porous.

Image Quality: The porous film was printed upon using a Xaar piezoelectric inkjet printhead described above. The ink coverage on the film surface was fairly uniform with a slight degree of mottling evident. Evaluation of the test pattern indicated that the TLWR was 0.67 mm, and the CD was 1.21. Thus, although the CD of this sample is close to that of Example 9, the resolution, inter-color bleeding, and ink coverage are distinctly poorer. In addition, this sample was dry immediately after printing. These observations are likely due to the larger pore sizes on the surface of this substrate; SEM shows some pores as large as 200 μm. This again is indication that the image quality is strongly dependent on both the selection of print additives used to maintain high color density and on the processing to generate a pore structure that takes ink away from the surface but does not interfere with resolution, ink coverage, or induce bleeding.

In addition to inkjet printing, a portion of this sample was also printed upon via traditional screen-printing for comparison, as described in Example 5. In contrast to inkjet printing, the image quality of the screen-printed sample was better with no bleeding, high resolution and a color density of 1.55. It should be noted that although there were slight differences in the CDs of the three screen printed samples (Examples 5, 9, and 10), their overall image qualities were very similar. All three samples provided very good resolution, and the difference in CD between Examples 9 (the highest CD) and 5 (the lowest CD) was only 30%. In contrast, the overall image qualities of the corresponding samples printed by inkjet printing were significantly different. Example 9 had a far better IQ than Example 5. Its CD, for example, was 206% higher and it had a TLWR of 0.50 mm. Whereas, Example 5 had such a large amount of intercolor bleed that no TLWR was resolvable using our test pattern. Example 10 fell between the other two samples in both image quality measurements. Thus, printing via piezoelectric inkjet printing is a much more demanding method, and its substrates must be more carefully prepared than for other printing methods such as screen printing.

Finally, a series of SEM micrographs were taken of the surface of this sample and its precursor pressed sheet after they had been exposed to ruthenium tetroxide (RuO$_4$) in order to selectively stain the additives in the film. FIG. 3 shows the surface of the oriented, cast film. Because the RuO$_4$ selectively stains double bonds, which are present in the additive resins and not in polypropylene, it generates contrast between the different resins. The light regions denote the presence of the additives resins (ELVALOY 741 and PARALOID B-67) on the surface of the pressed sheet. In FIG. 3 this contrast is still evident, indicating that the resins remain on the surface as separate phases from the polypropylene.

Comparative Example C6

This example is a demonstration of solvent-based piezoelectric inkjet printing on a cast sheet comprised of a blend of polypropylene with an inorganic filler, a terpolymer of ethylene/vinyl acetate/carbon monoxide, and poly(isobutyl methacrylate).

Sample Preparation: A sample containing 40 weight % polypropylene homopolymer (FINA 3376 available from Atofina, Inc., Houston, Tex.), 40 weight % calcium metasilicate (wollastonite Micronite 800H available from Fibertec Inc., Bridgewater, Mass.), 10 weight % of a terpolymer of ethylene/vinyl acetate/carbon monoxide (ELVALOY® 741 available from DuPont Packaging and Industrial Polymers, Wilmington, Del.), and 10 weight % of poly (isobutyl methacrylate) (Parloid® B-67 available from Rohm and Haas Co., Philidelphia, Pa.) was compounded and cast using a 25 mm twin screw extruder (available from Werner & Pfleiderer GmbH, Stuttgart, Germany) operated at 193° C., equipped with a die which was operated at 200° C. The cast material was quenched on a chrome wheel operated at 38° C. The line was run at 4.6 m/min. The resulting cast sheet had a thickness of 0.53 mm and a density of 1.23 g/cm$^3$.

Image Quality: The cast sheet was printed upon using a Xaar piezoelectric inkjet printhead described above. Similar to Example 1, the ink coverage on the film surface was non-uniform with a slight degree of mottling evident. Because of large amount of inter-color bleeding, the test pattern was not resolvable, making it impossible to measure a TLWR. It was, however, possible to measure a solid block CD in certain regions of 1.47. It was also observed that the ink was extremely wet immediately after printing and did not dry for several hours afterwards. Thus, it is evident that although this sample contained the same additives as in Example 9 and 10, its lack of porosity resulted in very poor image quality due to the large degree of inter-color bleeding.

Example 11

This example is a demonstration of solvent-based piezoelectric inkjet printing on a biaxially oriented film comprised of a blend of polypropylene with an inorganic filler, a terpolymer of ethylene/vinyl acetate/carbon monoxide, and poly(isobutyl methacrylate).

Figure 4:
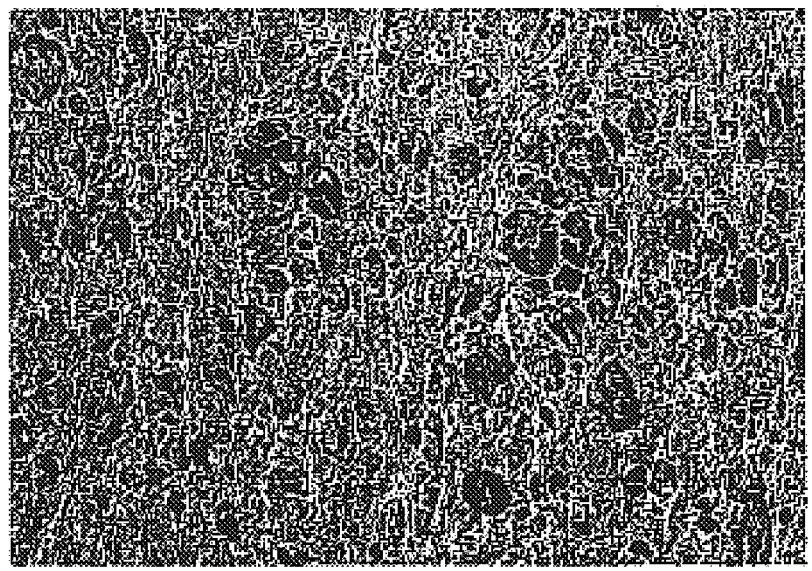
FIG. 4 is a digital image of a scanning electron micrograph (SEM) of the surface of the ink-receptive article of Example 11.

Sample Preparation: A sheet was compounded and cast in the same manner as described in Example C6 except that it was 1 mm in thickness and having a density of 1.28 g/cm$^3$. This cast sheet was oriented sequentially using a length orienter (LO) and tenter (TD) (both manufactured by Brückner Maschinenbau GmbH, Siegsdorf, Germany) at a draw ratio of 2.0 in MD and 3.75 in TD as determined by Test Method 1. The final biaxial stretch was, therefore, 2.0×3.75 (MD×TD). The temperatures of the LO rolls were each 90° C. and the tenter zones were all heated to 159° C. The resulting oriented film had a thickness of approximately 0.25 mm and a density of 0.45 g/cm$^3$, indicating a void content of 65% as per Test Method 2. FIG. 4 shows SEM images of the surface of the oriented film, indicating that the film is highly voided with a surface that is very porous.

Image Quality: The porous film was printed upon using a Xaar piezoelectric inkjet printhead described above. Similar to Example 10 (which has the same composition but was prepared in a different manner), the ink coverage on the film surface was fairly uniform with a slight degree of mottling evident. Evaluation of the test pattern indicated that the TLWR was 0.59 mm, and the CD was 1.15. Thus, although the CD of this sample was slightly lower than Example 10, the resolution, inter-color bleeding, and ink coverage were distinctly better. It was also observed that this sample was dry after immediately printing. The differences between this sample and Example 10 are again most likely due to the differences in pore structure resulting from the different orientation processing. This sample was oriented in a sequential manner, whereas Example 10 was oriented in a simultaneous manner. Indeed, comparing FIGS. 3 and 4, it is apparent that there are different pore structures present. This sample has a more fibrous surface that is a result of its initial MD orientation. The final result is that this example has an overall image quality that is notably better than that of Example 10.

Comparative Example C-7

This example is a demonstration of solvent-based piezoelectric inkjet printing on a biaxially oriented film comprised of a blend of polypropylene with an inorganic filler, a terpolymer of ethylene/vinyl acetate/carbon monoxide, and poly(isobutyl methacrylate) laminated to an adhesive liner. Sample Preparation: A sheet was compounded and cast in the same manner as described in Example C-6, having a density of 1.28 g/cm$^3$ and a thickness of 0.5 mm. The cast sheet was stretched in a similar manner as that described in Example 1 except at a temperature of 155° C. and with a final biaxial stretch of 3.0×3.0 (MD×TD) as determined by Test Method 1. The resulting oriented film had a thickness of approximately 0.11 mm and a density of 1.0 g/cm$^3$, indicating a void content of 22% as per Test Method 2. SEM images of the surface of the oriented film indicates that the film is not very porous. The oriented film was laminated onto an acrylic-based adhesive coated at 25 g/m$^2$ onto a polyethylene coated paper liner treated with a cured silicone release system.
Image Quality: A graphical image was printed upon the surface using an Arizona Sign Printer (Model SP-62 available from Gretag Imaging Inc., Holyoke, Mass.) using the Scotchcal™ 3700 series inks described above in addition to light magenta (3781) and light cyan (3786) using a 63% ink lay down. The graphic was observed to have a fairly poor image quality, as it was blurry, mottled and faded. The poor image quality is likely due to the lack of porosity on the surface that allowed the ink to bleed on the surface.

Example 12

This example is a demonstration of solvent-based piezoelectric inkjet printing on a biaxially oriented film comprised of a blend of polypropylene with an inorganic filler, a terpolymer of ethylene/vinyl acetate/carbon monoxide, and poly(isobutyl methacrylate) laminated to an adhesive liner. Sample Preparation: An oriented film was prepared in an identical manner to that described in Example 11 and laminated onto an adhesive liner in the same manner as described in Example 13. The oriented film had a thickness of approximately 0.45 mm and a density of 0.43 g/cm$^3$, indicating a void content of 66% as per Test Method 2.
Image Quality: A graphical image was printed upon the surface in the same manner as described in Comparative Example C-7; however, its image quality was substantially superior to that of Example C-7. Ink coverage was significantly more vibrant and uniform, and the image was not blurry. The SEM of the equivalent material (described in Example 10) shows the surface of this sample is much more porous than that of Comparative Example C-7. Thus, it is this surface porosity in conjunction with the added resins that allow the image quality of this material to be significantly better than that of Comparative Example C-7.

Example 13

This example is a demonstration of solvent-based piezoelectric inkjet printing on a biaxially oriented film comprised of a blend of polypropylene with an inorganic filler, a terpolymer of ethylene/vinyl acetate/carbon monoxide, and poly(isobutyl methacrylate).
Sample Preparation: A sample was compounded and pressed in a similar manner to Example 1 except that it contained 40 weight % polypropylene homopolymer (FINA 3374 available from Atofina Inc., Houston, Tex.) with 40 weight % precipitated calcium carbonate (Vicality™ Albaglos™ PCC available from Specialty Minerals, Bethlehem, Pa.), 10 weight % of a terpolymer of ethylene/vinyl acetate/carbon monoxide (ELVALOY™ 741 available from DuPont Packaging and Industrial Polymers, Wilmington, Del.), and 10 weight % of poly(isobutyl methacrylate) (PARALOID™ B-67 available from Rohm and Haas, Co., Philadelphia, Pa.). The density of the resulting pressed sheet was 1.24 g/cm$^3$ and the thickness was approximately 1 mm. The pressed sheet was stretched in the same manner as Example 1 with a final biaxial stretch of 3.5×3.5 (MD×TD) as determined by Test Method 1. The resulting oriented film had a thickness of approximately 0.13 mm and a density of 0.98 g/cm$^3$, indicating a void content of 21% as per Test Method 2. SEM images of the surface and cross section of the oriented film, indicates that the film is voided with a surface that is porous.
Image Quality: The porous film was printed upon using a Xaar piezoelectric inkjet printhead described above. The ink coverage on the film surface was non-uniform with a significant amount of mottling evident. There was also a high degree of inter-color bleeding that made the test pattern not resolvable, and it was not possible to measure a TLWR. Although the ink coverage was non-uniform, it was possible to measure a solid block CD in certain regions of 1.16. The poor image quality is likely due to large pore size and low void content. It was also noted that the ink was still wet immediately after printing. Thus, although this sample has been stretched in the same fashion as Example 10 and has the exact same print additives, the pore structure was not optimal for inkjet printing, resulting in an image quality that was significantly lower. The only difference between this sample and Example 10 is the type of particulate filler used. In this case, the particle is CaCO$_3$ having a median particle size of 0.8 μm. In the next two examples, the results when using two additional different types of calcium carbonate fillers are described. A comparison of the effects of these different particle types is made below in the discussion of Example 15.

Example 14

This example is a demonstration of solvent-based piezoelectric inkjet printing on a biaxially oriented film comprised of a blend of polypropylene with an inorganic filler, a terpolymer of ethylene/vinyl acetate/carbon monoxide, and poly(isobutyl methacrylate).
Sample Preparation: A sample was compounded and pressed in a similar manner to Example 1 except that it contained 40 weight % polypropylene homopolymer (FINA 3374 available from Atofina Inc., Houston, Tex.) with 40 weight % precipitated calcium carbonate (CALESSENCE™ 300 PCC available from Specialty Minerals, Bethlehem, Pa.), 10 weight % of a terpolymer of ethylene/vinyl acetate/carbon monoxide (ELVALOY™ 741 available from DuPont Packaging and Industrial Polymers, Wilmington, Del.), and 10 weight % of poly(isobutyl methacrylate) (PARALOID™

B-67 available from Rohm and Haas, Co., Philadelphia, Pa.). The density of the resulting pressed sheet was 1.21 g/cm$^3$, and the thickness was approximately 1 mm. The pressed sheet was stretched in the same manner as Example 1 with a final biaxial stretch of 3.5×3.5 (MD×TD) as determined by Test Method 1. The resulting oriented film had a thickness of approximately 0.15 mm and a density of 0.76 g/cm$^3$, indicating a void content of 37% as per Test Method 2. SEM images of the surface and cross section of the oriented film indicates that the film is voided with a surface that is porous.

Image Quality: The porous film was printed upon using a Xaar piezoelectric inkjet printhead described above. The ink coverage on the film surface was non-uniform with a significant amount of mottling evident. There was also a high degree of inter-color bleeding that made the test pattern not resolvable, and it was not possible to measure a TLWR. Although the ink coverage was non-uniform, it was possible to measure a solid block CD in certain regions of 1.10. It was observed that the sample was dry immediately after printing. As with Example 13, this sample was stretched in the same fashion as Example 10 and has the exact same print additives, but the pore structure was not optimal for inkjet printing, resulting in an image quality that was significantly lower. Again, the only difference between this sample and Example 10 is the type of particulate filler used. In this case, the particle is CaCO$_3$ having a median particle size of 3 μm.

Example 15

This example is a demonstration of solvent-based piezoelectric inkjet printing on a biaxially oriented film comprised of a blend of polypropylene with an inorganic filler, a terpolymer of ethylene/vinyl acetate/carbon monoxide, and poly(isobutyl methacrylate).

Sample Preparation: A sample was compounded and pressed in a similar manner to Example 1 except that it contained 40 weight % polypropylene homopolymer (FINA 3374 available from Atofina Inc., Houston, Tex.) with 40 weight % surface treated fine ground limestone (Hi-Pflex™ 100 PCC available from Specialty Minerals, Bethlehem, Pa.), 10 weight % of a terpolymer of ethylene/vinyl acetate/carbon monoxide (ELVALOY™ 741 available from DuPont Packaging and Industrial Polymers, Wilmington, Del.), and 10 weight % of poly(isobutyl methacrylate) (PARALOID™ B-67 available from Rohm and Haas, Co., Philadelphia, Pa.). The density of the resulting pressed sheet was 1.28 g/cm$^3$, and the thickness was approximately 1 mm. The pressed sheet was stretched in the same manner as Example 1 with a final biaxial stretch of 3.5×3.5 (MD×TD) as determined by Test Method 1. The resulting oriented film had a thickness of approximately 0.17 mm and a density of 0.81 g/cm$^3$, indicating a void content of 37% as per Test Method 2 SEM images of the surface and cross section of the oriented film indicates that the film is voided with a surface that is porous.

Image Quality: The porous film was printed upon using a Xaar piezoelectric inkjet printhead described above. The ink coverage on the film surface was fairly uniform with a minor amount of mottling evident. Evaluation of the test pattern indicated that the TLWR was 0.50 mm, and the CD was 1.13. It was observed that this sample was wet immediately after printing. In contrast to Examples 13 and 14, this sample manifests an overall image quality that is nearly as high as that of Example 10. The SEM images show the surface pores are significantly smaller than Examples 13 and 14, and the interior appears more uniformly voided. Thus, the pore structure generated in this sample was far more optimal for inkjet printing than Examples 13 and 14, but somewhat less than that of Example 10.

The key difference between each of these samples is the type of particulate filler used to induce voiding upon stretching. In this sample, the particles are limestone ground to an average size of 3.5 μm that has been surface treated with stearic acid at a level of 1%. The filler particle used in Example 10 was calcium metasilicate that was surface treated with phenyl ethoxy silane, having an average length of 22 um and a diameter of 3 microns. Thus it is an acicular (needle-like) particle. Table 3 summarizes the types of fillers used in Examples 10, 13, 14, and 15. Comparing the results for these with the corresponding particle types used suggests that particle size may not be the primary factor in choosing the particle type. Examples 14 and 15 contained particles of nearly the same size, but after stretching they resulted in substantially different films. Noting that both Examples 10 and 15 were surface coated, it appears that an important factor in selecting a particle type is that it is coated with a dispersing agent to prevent the particles from agglomerating together.

TABLE 3

Characteristics of Various Inorganic Particulate Fillers

| Filler Type | Particle Size (μm) | Coating |
|---|---|---|
| Calessence 300 PCC | 3.0 | none |
| Hi-Pflex 100 | 3.5 | 1% stearic acid |
| Micronite 800H wollastonite | 22 × 3 | phenyl ethoxy silane |
| Vicality Albaglos PCC | 0.8 | none |

Summary:

A summary of the examples described above is presented in Table 4. Based on these examples, it is apparent that preparation of an oriented polyolefin-based substrate for piezoelectric inkjet is not a trivial task. As Examples 5, 9, and 10 indicate, materials that are nearly equivalent when printed upon via other methods such as screen printing may have vastly different image qualities when printed by inkjet printing. The examples described above also highlight the key parameters that must be controlled in order to generate a biaxially oriented polyolefin-based substrate that will be suitable for solvent-based inkjet printing.

The final film should be sufficiently porous to minimize inter-color ink bleed, but the surface pores should be small enough such that they do not adversely affect the spreading of ink drops on the surface. This pore structure may be varied to some extent by changing the stretching conditions (draw ratios and temperature). To prevent the ink from being drawn by capillary forces away from the surface, resulting in low CD, it is also necessary to include additive resins into the film that have sufficient affinity for the ink to hold it near the surface. These additives are also responsible for inducing the porosity within the film, as they should be sufficiently immiscible with the polyolefin matrix that upon stretching they disengage from the polypropylene and generate fissures within the striated layers and especially on the surface.

For each different type of ink, the optimal additive resin may vary. To help narrow the range of additives, one may utilize the simple IT# test described in Test Method 4.

Incorporation of inorganic filler particulates also plays an important role in determining the printability of the resulting film. The filler particles generate the internal voiding during stretching that provide the necessary volume for holding the ink once it is drawn away from the surface. In addition, the voiding within the film makes it white and opaque which is important for most imaging films. It appears that dispersal of the filler so that agglomerates do not form improves the void structure throughout the film and correspondingly the image quality.

Finally, it is important to note that these factors are strongly coupled in how they impact the final imageability of the resulting film such that a change in one factor (e.g. additive resin type) may force one to also change the other parameters (e.g. processing conditions) in order to maintain high image quality. Thus, some iterative optimization is inherent to the design of these substrates.

TABLE 4

Summary of image quality measurements, processing, and compositions of examples

| Example | CD | TLWR | MD × TD | voids | Additives | Filler Type |
|---|---|---|---|---|---|---|
| C1 | 1.92 | 0.50 | — | — | — | — |
| C2 | 0.95 | 0.42 | — | 40 | — | — |
| C3 | 1.73 | o.s. | 3.5 × 3.5 | 33 | — | Micronite 800H |
| C4 | 1.57 | o.s. | 6.0 × 6.0 | 58 | — | Micronite 800H |
| C6 | 1.47 | o.s. | — | 0 | 10% Elvaloy 741 10% Paraloid B67 | Micronite 800H |
| 1 | 1.24 | 0.42 | 3.5 × 3.5 | 65 | 5% Elvaloy 741 | Micronite 800H |
| 2 | 1.33 | 0.59 | 5.5 × 5.5 | 74 | 5% Elvaloy 741 | Micronite 800H |
| 3 | 1.19 | 0.67 | 3.5 × 3.5 | 71 | 20% Elvaloy 741 | Micronite 800H |
| 4 | 1.06 | o.s. | 3.5 × 3.5 | 65 | 20% Elvax 240 | Micronite 800H |
| 5 | 0.60 | o.s. | 3.5 × 3.5 | 62 | 20% Kraton 1107 | Micronite 800H |
| 6 | 1.23 | 0.67 | 3.5 × 3.5 | 76 | 10% CP-80 Clear | Micronite 800H |
| 7 | 1.15 | 0.67 | 3.5 × 3.5 | 67 | 10% Paraloid B-67 | Micronite 800H |
| 8 | 1.26 | o.s. | 3.5 × 3.5 | 73 | 10% Luran 358N | Micronite 800H |
| C-5 | 1.30 | o.s. | 3.5 × 3.5 | 49 | 10% Engage 8200 | Micronite 800H |
| 9 | 1.24 | 0.50 | 3.5 × 3.5 | 70 | 5% Elvaloy 741 5% Paraloid B67 | Micronite 800H |
| 10 | 1.21 | 0.67 | 3.5 × 3.5 | 66 | 10% Elvaloy 741 10% Paraloid B67 | Micronite 800H |
| 11 | 1.15 | 0.59 | 2.0 × 3.75 | 65 | 10% Elvaloy 741 10% Paraloid B67 | Micronite 800H |
| C-7 | n.m. | n.m. | 3.0 × 3.0 | 22 | 10% Elvaloy 741 10% Paraloid B67 | Micronite 800H |
| 12 | n.m. | n.m. | 3.5 × 3.5 | 66 | 10% Elvaloy 741 10% Paraloid B67 | Micronite 800H Vicality |
| 13 | 1.16 | o.s. | 3.5 × 3.5 | 21 | 10% Elvaloy 741 10% Paraloid B67 | Albaglos PCC Calessence 300 |
| 14 | 1.10 | o.s. | 3.5 × 3.5 | 37 | 10% Elvaloy 741 10% Paraloid B67 | PCC |
| 15 | 1.13 | 0.50 | 3.5 × 3.5 | 37 | 10% Elvaloy 741 10% Paraloid B67 | Hi-Pflex 100 |

Note:
n.m. indicates that a value was not measured for the example
o.s. indicates that the value was off the scale of the measurement

What is claimed is:

1. An image receptor medium comprising a porous, biaxially oriented, melt-processed image receptive film layer comprising a) an immiscible blend of a semicrystalline polymer component and an ink absorptive polymer component and b) an inorganic filler.

2. The receptor medium of claim 1, wherein the void content is at least 30%.

3. The receptor medium of claim 1, wherein the void content is at least 50%.

4. The receptor medium of claim 1, wherein the void content is at least 60%.

5. The receptor medium of claim 1 wherein said ink absorptive polymer has an Inclined Ink Trail Test value of from about 0.75 to 2.0.

6. The receptor medium of claim 1 wherein said ink absorptive polymer has an Inclined Ink Trail Test value of from about 0.9 to 1.25.

7. The image receptor medium of claim 1, wherein said ink absorptive polymer component is an ethylene/vinyl acetate/carbon monoxide terpolymer.

8. The image receptor medium of claim 7, wherein said terpolymer comprises 50% to about 80% of ethylene monomer; from about 10% to about 30% of vinyl acetate monomer; and from about 4% to about 15% carbon monoxide monomer.

9. The image receptor medium of claim 3, wherein said ink absorptive polymer component is present in amounts of 2 to 40 weight %, relative to the weight of the immiscible polymer blend.

10. The image receptor medium of claim 1 wherein ink absorptive polymer is present in the image receptive layer at a level of from about 8 to about 20 weight percent, relative to the weight of the immiscible polymer blend.

11. The image receptor medium of claim 1 wherein the semicrystalline polymer component is selected from high and low density polyethylene, linear low density polyethylene, polypropylene, polyoxymethylene, poly (methyl pentene), poly(ethylene terephthalate), poly (butylene terephthalate), polybutene, and syndiotactic polystyrene.

12. The image receptor medium of claim 1 comprising a continuous phase of said semicrystalline polymer component and a discontinuous phase of said ink absorptive polymer component.

13. The image receptor of claim 1 wherein said inorganic filler is selected from solid or hollow glass, ceramic or metal particles, microspheres or beads; zeolite particles; metal oxides; metal, alkali- or alkaline earth carbonates silicates, metasilicates, aluminates or sulfates; kaolin, talc, clays, titanium dioxide or carbon black.

14. The image receptive medium of claim 1 wherein said inorganic filler is present in amounts from 25 to 50 weight percent, relative to the weight of the image receptive layer.

15. The image receptor of claim 1 wherein the degree of said biaxially orientation is 5× to 100× total draw ratio.

16. The image receptor medium of claim 1, further comprising a support layer.

17. The image receptor medium of claim 16 wherein the support layer is non-plasticized.

18. The image receptor medium of claim 16 wherein the support layer comprises polyester, polyolefin, polyamide, polycarbonate, polyurethane, polystyrene, acrylic, or combinations thereof.

19. The image receptor medium of claim 16 wherein the support layer has an adhesive on a surface opposite the image receptive layer.

20. The image receptor medium of claim 19 having a tie layer between the adhesive and the support layer.

21. The image receptor medium of claim 2 having surface voids wherein the average size of the surface voids is from 10 to 70 micrometers.

22. The image receptor medium of claim 1, wherein said ink absorptive polymer component is an ethylene/vinylacetate copolymer.

* * * * *

UNITED STATES PATENT AND TRADEMARK OFFICE
CERTIFICATE OF CORRECTION

PATENT NO. : 6,790,491 B2
APPLICATION NO. : 10/176556
DATED : September 14, 2004
INVENTOR(S) : John M. Sebastian It is certified that error appears in the above-identified patent and that said Letters Patent is hereby corrected as shown below:

Title Page Item (56), Column 2
Under "(Other Publications)", line 12 under ASTM Designation: F 1857, delete "Ouptput" and insert -- Output --, therefor.

Column 33
Under Table 4, in Col. 5, in Row 2, delete "voids" and insert -- voids % --, therefor.

Column 36
Line 8, in Claim 22, delete "vinylacetate" and insert -- vinyl acetate --, therefor.

Signed and Sealed this

Twenty-fourth Day of April, 2007

JON W. DUDAS
*Director of the United States Patent and Trademark Office*